United States Patent
Bracholdt et al.

(10) Patent No.: US 11,449,529 B2
(45) Date of Patent: *Sep. 20, 2022

(54) PATH GENERATION AND SELECTION TOOL FOR DATABASE OBJECTS

(71) Applicant: SAP SE, Walldorf (DE)

(72) Inventors: Sandra Bracholdt, Dielheim (DE); Volker Saggau, Bensheim (DE); Jan Portisch, Bruchsal (DE)

(73) Assignee: SAP SE, Walldorf (DE)

( * ) Notice: Subject to any disclaimer, the term of this patent is extended or adjusted under 35 U.S.C. 154(b) by 186 days.

This patent is subject to a terminal disclaimer.

(21) Appl. No.: 16/926,097

(22) Filed: Jul. 10, 2020

(65) Prior Publication Data

US 2020/0342007 A1 Oct. 29, 2020

Related U.S. Application Data

(63) Continuation of application No. 16/027,010, filed on Jul. 3, 2018, now Pat. No. 10,726,052.

(51) Int. Cl.
*G06F 16/00* (2019.01)
*G06F 16/28* (2019.01)
*G06F 16/26* (2019.01)
*G06F 16/21* (2019.01)
*G06F 3/04842* (2022.01)

(52) U.S. Cl.
CPC .......... *G06F 16/288* (2019.01); *G06F 16/212* (2019.01); *G06F 16/26* (2019.01); *G06F 3/04842* (2013.01)

(58) Field of Classification Search
None
See application file for complete search history.

(56) References Cited

U.S. PATENT DOCUMENTS

| 5,546,570 A | 8/1996 | McPherson, Jr. et al. |
| 7,111,020 B1 | 9/2006 | Gupta |

(Continued)

OTHER PUBLICATIONS

Notice of Allowance received in U.S. Appl. No. 16/220,886, dated Nov. 30, 2020, 11 pages.

(Continued)

*Primary Examiner* — Debbie M Le
(74) *Attorney, Agent, or Firm* — Klarquist Sparkman, LLP

(57) ABSTRACT

Techniques and solutions are described for determining, evaluating, and selecting data retrieval pathways. A plurality of database objects, such as tables, can be retrieved, and relationships between them determined. The relationships are between various attributes of the database objects. A plurality of pathways are determined between at least two target database objects, where the path determination does not consider attribute-level relationship information. After a path is determined, the relationship-level information can be added. A summary of the path, and relationship information, can be displayed to a user. A user can select paths to remove from the display, and can indicate one or more database objects that are required for a valid path, one or more database objects that are prohibited from valid paths, or combinations thereof. A user can select a path, and a query language statement to implement the path can be generated and displayed to the user.

27 Claims, 27 Drawing Sheets

(56) References Cited

U.S. PATENT DOCUMENTS

| | | | |
|---|---|---|---|
| 7,158,994 B1 | 1/2007 | Smith | |
| 7,480,669 B2 | 1/2009 | Lo et al. | |
| 7,644,361 B2 | 1/2010 | Wu | |
| 8,869,020 B2 | 10/2014 | Daga | |
| 9,317,557 B2 | 4/2016 | Shao et al. | |
| 9,400,815 B2 | 7/2016 | Poppitz | |
| 9,436,735 B1 | 9/2016 | Feng et al. | |
| 10,061,841 B2* | 8/2018 | Xiong | G06F 16/285 |
| 10,176,220 B2* | 1/2019 | Pirahesh | G06F 16/2453 |
| 10,810,210 B2 | 10/2020 | Shoudhury | |
| 10,885,046 B2* | 1/2021 | Li | G06F 16/24578 |
| 2001/0034733 A1 | 10/2001 | Prompt | |
| 2003/0088558 A1 | 5/2003 | Zaharloudakis et al. | |
| 2004/0015783 A1 | 1/2004 | Lennon | |
| 2004/0181543 A1 | 9/2004 | Wu | |
| 2005/0060647 A1 | 3/2005 | Doan | |
| 2005/0097078 A1 | 5/2005 | Lohman et al. | |
| 2006/0101011 A1 | 5/2006 | Lindsay et al. | |
| 2006/0117057 A1 | 6/2006 | Legault et al. | |
| 2006/0173873 A1 | 8/2006 | Prompt | |
| 2007/0276836 A1 | 11/2007 | Chatterjee et al. | |
| 2009/0019022 A1 | 1/2009 | Schallert et al. | |
| 2009/0043689 A1 | 2/2009 | Yang et al. | |
| 2011/0008801 A1 | 1/2011 | Camesano et al. | |
| 2015/0293512 A1 | 10/2015 | Egge | |
| 2016/0063043 A1 | 3/2016 | Carroll et al. | |
| 2016/0217423 A1 | 7/2016 | Magnan et al. | |
| 2016/0357787 A1 | 12/2016 | Kolata et al. | |
| 2017/0024488 A1 | 1/2017 | Henderson | |
| 2018/0024814 A1 | 1/2018 | Ouali | |
| 2019/0303405 A1 | 10/2019 | Kothari et al. | |
| 2020/0012171 A1 | 1/2020 | Yoshino et al. | |
| 2020/0012741 A1 | 1/2020 | Bracholdt et al. | |
| 2020/0192892 A1 | 6/2020 | Portisch et al. | |
| 2020/0192901 A1 | 6/2020 | Portisch et al. | |

OTHER PUBLICATIONS

Notice of Allowance received in U.S. Appl. No. 16/027,010, dated Mar. 24, 2020, 12 pages.

Non Final Office Action received in U.S. Appl. No. 16/221,151, dated Aug. 19, 2020, 20 pages.

Final Office Action received in U.S. Appl. No. 16/221,151, dated Mar. 18, 2021, 22 pages.

Notice of Allowance received in U.S. Appl. No. 16/221,151, dated Jun. 16, 2021, 14 pages.

Office Action received in U.S. Appl. No. 16/220,886, dated Aug. 5, 2020, 16 pages.

"Alternative Keys," SAP Help Portal, May 17, 2018, 2 pages.

"Association," SAP Help Portal, May 17, 2018, 3 pages.

"CDS Associations and Propagation with SQL in SAP HANA," May 17, 2018, 4 pages.

"CDS Associations," SAP HANA Developer Guide, SAP Help Portal, May 17, 2018, 5 pages.

"Creating Alternate Keys," SAP Help Portal, May 17, 2018, 1 page.

"CS 345: Topics in Data Warehousing," Oct. 12, 2004, 29 pages.

"Customizing and Extending Power Designer," PowerDesigner® 16.0, Sybase, Jul. 2011, 428 pages.

"Don't Try Coding ABAP Core Data Services Without Reading This First," Mar. 18, 2017, 10 pages.

"SAP HANA Developer Guide," SAP HANA Platform 2.0 SPS 00, Nov. 30, 2016, 952 pages.

\* cited by examiner

```
public function InitialzieObjectAttributes(myObjectCollection)
  dim myObject
  for each myObject in myObjectCollection
    myObject.SetExtendedAttribute "UsedInPathCalculation", 0
    myObject.SetExtendedAttribute "VisitedDuringThisPathCalculation", 0 dim FromSourceToObjectPaths
    set FromSourceToObjectPaths = myObject.GetExtendedCollection("FromSourceToObjectPaths")
    FromSourceToObjectPaths.Clear()

next
end function public function InitialzieViewBuilderPackage(myPackage)
  'GetCalcObjectList
  dim myCalcObjectList
  set myCalcObjectList = myPackage.GetExtendedCollection("CalculationObjects")
  myCalcObjectList.Clear()

'Initialzie Table List with all Tables from the model
  AddMyObjectsFromPackage myPackage.Model, myCalcObjectList 'Init the Attributes of the Objects Used for Calculation
  InitialzieObjectAttributes myCalcObjectList 'Clear ExtendedObject Collection
  myPackage.ExtendedObjects.Clear(true)

CountGlobalPaths = 1
end function
```

FIG. 9A

```
public function IterateReferenceCollection(myPackage, CalcObjectList, References, SourceObject, TargetObject, myTargetCollection, myCalcPath)
    IterateReferenceCollection = 0
    dim IterateReferenceIntermediate dim myReference, myObject
    set myObject = nothing
    for each myReference in References
        if myReference.ChildTable = SourceObject then
            set myObject = myReference.ParentTable
        end if
        if myReference.ParentTable = SourceObject then    'to not use circles 2 if
            set myObject = myReference.ChildTable
        end if
        if myObject is nothing then
            'this was either a circle or something went wrong
        else
            if IsObjectInCollection(CalcObjectList, myObject) then
                IterateReferenceIntermediate = FindMyPath(myPackage, CalcObjectList, myObject, TargetObject, myTargetCollection, myCalcPath)
                if IterateReferenceIntermediate = 1 then
                    IterateReferenceCollection = 1
                end if
            end if
        end if
    next
end function dim CountGlobalPaths
public function SaveMyCalcPathToObject(myPackage, myObject, myCalcPath)
    dim myNewPath
    set myNewPath = myPackage.ExtendedObjects.CreateNew myNewPath.Stereotype = "Path"
    myNewPath.Name = myPackage.Name & "_Path" & CountGlobalPaths
    CountGlobalPaths = CountGlobalPaths + 1 dim ObjectsInPathCollection
    set ObjectsInPathCollection = myNewPath.GetExtendedCollection("ObjectsInPath")

dim myObj
    for each myObj in myCalcPath.m_PathCalcObjects
        if isObject(myObj) then
            ObjectsInPathCollection.Insert -1, myObj
        end if
    next dim FromSourceToObjectPaths
    set FromSourceToObjectPaths = myObject.GetExtendedCollection("FromSourceToObjectPaths")

FromSourceToObjectPaths.Add(myNewPath)
end function
```

FIG. 9B

```
public function IterateRelations(myPackage, CalcObjectList, SourceObj, TargetObj, myTargetCollection, myCalcPath)

IterateRelations = 0
SourceObj.SetExtendedAttribute "VisitedDuringThisPathCalculation", 1 dim preCon
preCon = IterateReferenceCollection(myPackage, CalcObjectList, SourceObj.InReferences, SourceObj, TargetObj, myTargetCollection, myCalcPath)
if preCon = 1 then
    IterateRelations = 1
end if
preCon = IterateReferenceCollection(myPackage, CalcObjectList, SourceObj.OutReferences, SourceObj, TargetObj, myTargetCollection, myCalcPath)
if preCon = 1 then
    IterateRelations = 1
end if
if IterateRelations = 0 then    'Reset because it can be visited from other direction and work fine
    SourceObj.SetExtendedAttribute "VisitedDuringThisPathCalculation", 0
end if
end function dim iCountGlobal
iCountGlobal = 0
```

FIG. 9C

```
public function FindMyPath(myPackage, CalcObjectList, SourceObj, TargetObj, myTargetCollection, myCalcPath)

'ShortCutHandling
If SourceObj.isShortCut() then
    set SourceObj = SourceObj.TargetObject
end if If TargetObj.isShortCut() then
    set TargetObj = TargetObj.TargetObject
end if FindMyPath = 0

'Forward Path
dim myNewForwardPath
set myNewForwardPath = myCalcPath.CopyPath
myNewForwardPath.AttachObjectToPath SourceObj 'Save Way To Object
SaveMyCalcPathToObject myPackage, SourceObj, myCalcPath 'Exit condition --> Found Path
if SourceObj = TargetObj then
    SourceObj.SetExtendedAttribute "VisitedDuringThisPathCalculation", 2
    SourceObj.SetExtendedAttribute "UsedInPathCalculation", 1
    FindMyPath = 1
    iCountGlobal = iCountGlobal+1
    output "Found " & iCountGlobal
else
    dim myVisitedDuringThisPathCalcStatus, myUsedInPathCalculationStatus
    myVisitedDuringThisPathCalcStatus = SourceObj.GetExtendedAttribute("VisitedDuringThisPathCalculation")
    myUsedInPathCalculationStatus = SourceObj.GetExtendedAttribute("UsedInPathCalculation")

if myVisitedDuringThisPathCalcStatus = 1 then
        'Do nothing because Node was already visited and we do not want to run in circles
    else if myVisitedDuringThisPathCalcStatus = 2 then
        'Do nothing because it is already calculated
        FindMyPath = myUsedInPathCalculationStatus
    else 'not used yet
        FindMyPath = IterateRelations(myPackage, CalcObjectList, SourceObj, TargetObj, myTargetCollection, myNewForwardPath)
        if FindMyPath = 1 then
            'SourceObject is Used during Calculation
            SourceObj.SetExtendedAttribute "VisitedDuringThisPathCalculation", 2
            SourceObj.SetExtendedAttribute "UsedInPathCalculation", 1
        end if
    end if
end if
end function
```

FIG. 9D

```
public function CalculateInitialNodes(myPackage)

'Get the Targets
dim myTargetCollection
set myTargetCollection = myPackage.GetExtendedCollection("Targets")

'Get the possible Objects
dim myCalcObjectList
set myCalcObjectList = myPackage.GetExtendedCollection("CalculationObjects")

'Initialize Parameters
InitialzieObjectAttributes myCalcObjectList

'Initialize forward Path
dim myCalcPath
set myCalcPath = new CalcPath
myCalcPath.Init 'Calculate Objects needed for Path between Targets: myPackage- for extendedObjects
FindMyPath myPackage, myCalcObjectList, myTargetCollection.Item(0), myTargetCollection.Item(1), myTargetCollection, myCalcPath end function public function ReduceCalculationObjectsList(myPackage)
dim myTargetCollection
set myTargetCollection = myPackage.GetExtendedCollection("Targets")

if myTargetCollection.Count < 3 then
    dim myCalcObjectCollection, myObj
    set myCalcObjectCollection = myPackage.GetExtendedCollection("CalculationObjects")
    for each myObj in myCalcObjectCollection
        if myObj.IsShortCut() then
            if myObj.TargetObject.GetExtendedAttribute("UsedInPathCalculation") = 0 then
                myCalcObjectCollection.Remove myObj
            end if
        else
            if myObj.GetExtendedAttribute("UsedInPathCalculation") = 0 then
                myCalcObjectCollection.Remove myObj
            end if
        end if
    next
    exit function
end if
```

FIG. 9E

```
dim MyMainTarget
set MyMainTarget = myTargetCollection.Item(1)
if MyMainTarget.isShortCut() then
    set MyMainTarget = MyMainTarget.TargetObject
end if dim myCalcPaths
set myCalcPaths = MyMainTarget.GetExtendedCollection("FromSourceToObjectPaths")

dim myRemainingCalcObjects, myRemainingObjectsCount
myRemainingCalcObjects = array()
myRemainingObjectsCount = 1
redim preserve myRemainingCalcObjects(myRemainingObjectsCount)
myRemainingCalcObjects(0) = MyMainTarget dim iCount, myObject, myPath, myObjInPath
for iCount = 2 to myTargetCollection.Count - 1
    set myObject = myTargetCollection.Item(iCount)
    if IsObject(myObject) then
        if myObject.isShortCut() then
            set myObject = myObject.TargetObject
        end if 'Save all objects in MainTarget Path
        for each myPath in myCalcPaths
            if IsObject(myPath) then
                dim myObjInPathColl
                set myObjInPathColl = myPath.GetExtendedCollection("ObjectsInPath")
                if myObjInPathColl is nothing then
                else
                    if IsObjectInCollection(myObjInPathColl, myObject) then
                        dim newCount
                        newCount = myPath.GetExtendedAttribute("CountTargets")
                        newCount = newCount + 1
                        myPath.SetExtendedAttribute "CountTargets", newCount
                        for each myObjInPath in myObjInPathColl
                            if IsObject(myObjInPath) then
                                redim preserve myRemainingCalcObjects(myRemainingObjectsCount + 1)
                                myRemainingCalcObjects(myRemainingObjectsCount) = myObjInPath
                                myRemainingObjectsCount = myRemainingObjectsCount + 1
                            end if
                        next
                    end if
                end if
            end if
        next
    end if
next
```

FIG. 9F

```
'Save all FromSoureToObject Paths of this Object
    dim myCalcPathsObj
    set myCalcPathsObj = myObject.GetExtendedCollection("FromSourceToObjectPaths")
    for each myPath in myCalcPathsObj
        if IsObject(myPath) then
            set myObjInPathColl = myPath.GetExtendedCollection("ObjectsInPath")
            if myObjInPathColl is nothing then
            else
                for each myObjInPath in myObjInPathColl
                    if IsObject(myObjInPath) then
                        redim preserve myRemainingCalcObjects(myRemainingObjectsCount + 1)
                        myRemainingCalcObjects(myRemainingObjectsCount) = myObjInPath
                        myRemainingObjectsCount = myRemainingObjectsCount + 1
                    end if
                next
            end if
        end if
    next 'dim myCalcObjectCollection
set myCalcObjectCollection = myPackage.GetExtendedCollection("CalculationObjects")
for each myObject in myCalcObjectCollection
    dim res
    res = FindObjectInArray(myRemainingCalcObjects, myObject)
    if res = false then
        myCalcObjectCollection.Remove(myObject)
    end if
next 'remove Uninteresting Paths from MainTarget Path
for each myPath in myCalcPaths
    if IsObject(myPath) then
        dim myCount
        myCount = myPath.GetExtendedAttribute("CountTargets")
        if Int(myCount) < myTargetCollection.Count - 2 then
            myCalcPaths.Remove(myPath)
        end if
    end if
next end function
```

```
public function FindObjectInArray(myRemainingCalcObjects, myObject)
    FindObjectInArray = false
    dim myRemCalcObj
    for each myRemCalcObj in myRemainingCalcObjects
        if myRemCalcObj = myObject then
            FindObjectInArray = true
            exit function
        end if
    next
end function public function FindReferenceBetween(Object1, Object2)
    dim myRef
    for each myRef in Object1.InReferences
        if myRef.ParentTable = Object1 and myRef.ChildTable = Object2 then
            set FindReferenceBetween = myRef
            exit function
        end if
        if myRef.ChildTable = Object1 and myRef.ParentTable = Object2 then
            set FindReferenceBetween = myRef
            exit function
        end if
    next
    for each myRef in Object1.OutReferences
        if myRef.ParentTable = Object1 and myRef.ChildTable = Object2 then
            set FindReferenceBetween = myRef
            exit function
        end if
        if myRef.ChildTable = Object1 and myRef.ParentTable = Object2 then
            set FindReferenceBetween = myRef
            exit function
        end if
    next
    set FindReferenceBetween = nothing
end function
```

```
public function myDiagramAttachPaths(myEasyViewPackage, myDiagram)
    dim myExtendedObjects
    set myExtendedObjects = myEasyViewPackage.ExtendedObjects
    dim myObject
    for each myObject in myExtendedObjects
        if myObject.Stereotype = "Path" then
            dim myObjectsInPath
            set myObjectsInPath = myObject.GetExtendedCollection("ObjectsInPath")
            dim iCount
            for iCount = 1 to myObjectsInPath.Count - 1
                dim myReference
                set myReference = FindReferenceBetween(myObjectsInPath.Item(iCount-1), myObjectsInPath.Item(iCount))
                if myReference is nothing then
                    'do nothing
                else
                    dim mySymbol
                    set mySymbol = myDiagram.FindSymbol(myReference)
                    if mySymbol is nothing then
                        myDiagram.AttachLinkObject myReference
                    end if
                end if
            next
        end if
    next
end function
```

FIG. 9I

```
public function CreateInitialDiagram(myEasyViewPackage)
  dim myDiagram
  set myDiagram = myEasyViewPackage.DefaultDiagram 'Clear Diagram
  myDiagram.Symbols.Clear()

'Calc Objects
  dim myCalcObjectCollection
  set myCalcObjectCollection = myEasyViewPackage.GetExtendedCollection("CalculationObjects")

dim myObject
  for each myObject in myCalcObjectCollection
    if isObject(myObject) then
      if myObject.IsShortcut() then
        set myObject = myObject.TargetObject
      end if
      dim mySymbol
      set mySymbol = myDiagram.FindSymbol(myObject.true)
      if mySymbol is nothing then
        set mySymbol = myDiagram.AttachObject(myObject)
      end if
    end if
  next dim myTargetObjectCollection
  set myTargetObjectCollection = myEasyViewPackage.GetExtendedCollection("Targets")

dim myTarget
  for each myTarget in myTargetObjectCollection
    if myTarget.IsShortCut() then
      set myTarget = myTarget.TargetObject
    end if
    dim myObjSymbol
    set myObjSymbol = myDiagram.FindSymbol(myTarget,true)
    myObjSymbol.FillColor = RGB(255,0,0)
  next
  'myDiagramAttachPaths myEasyViewPackage, myDiagram myDiagram.CompleteLinks()
end function 'Main Method
Sub %Method%(obj)
  InitializeViewBuilderPackage(obj)

CalculateInitialNodes(obj)

ReduceCalculationObjectsList(obj)

CreateInitialDiagram(obj)
End Sub
```

FIG. 9J

```
class CalcPath
  public m_PathCalcObjects    'Contains Objects in the Path
  public m_PathRelations      'Contains Relations in the Path
  '--------------------------------
  '  Constructor
  '--------------------------------
  public function Init()
    'Initialize Object Array
    m_PathCalcObjects = array()
    redim m_PathCalcObjects(0)

'Initialize Path Array
    m_PathRelations = array()
    redim m_PathRelations(0)
  end function '--------------------------------
  ' Attach only Relation to the Path Array
  '--------------------------------
  public function AttachRelationToPath(myRelation)
    if IsObject(myRelation) then
      dim myPathSize
      myPathSize = ubound(m_PathRelations)
      redim preserve m_PathRelations(myPathSize + 1)
      set m_PathRelations(myPathSize) = myRelation
    end if
  end function '--------------------------------
  ' Attach only Object(if not existing) to the Path Array
  ' Just Add it because there can be loops
  '--------------------------------
  public function AttachObjectToPath(myObject)
    if IsObject(myObject) then
      dim myPathSize
      myPathSize = ubound(m_PathCalcObjects)
      redim preserve m_PathCalcObjects(myPathSize + 1)
      set m_PathCalcObjects(myPathSize) = myObject
    end if
  end function '--------------------------------
  ' Attach Relation and its objects To Path
  '--------------------------------
  public function AttachRelationAndObjectToPath(myRelation, myNextObject)
    if IsObject(myRelation) then
      'Attach Relation
      AttachRelationToPath(myRelation)

'Attach Next Object
      AttachObjectToPath(myNextObject)
    end if
  end function public function ContainsAllObjects(myObjectCollection)
    ContainsAllObjects = false
    dim myObject, myObject2, iCount
    iCount = 0
    for each myObject in myObjectCollection
      for each myObject2 in m_PathCalcObjects
        if IsObject(myObject2) then
          if myObject = myObject2 then
            iCount = iCount + 1
          end if
        end if
      next
    next
    if iCount = myObjectCollection.Count then
      ContainsAllObjects = true
    end if
  end function
```

FIG. 9K

```
' ----------------------------------------
' Copy Path
' ----------------------------------------
public function CopyPath()
  'Create New Path Object
  dim myNewPath
  set myNewPath = new CalcPath
  myNewPath.Init dim iCount
  'Copy Relationship Path Array
  dim PathRelationSize
  PathRelationSize = ubound(m_PathRelations)
  for iCount = 0 to PathRelationSize - 1
    myNewPath.AttachRelationToPath(m_PathRelations(iCount))
  next 'Copy Object Path Array
  dim PathObjectSize
  PathObjectSize = ubound(m_PathCalcObjects)
  for iCount = 0 to PathObjectSize - 1
    myNewPath.AttachObjectToPath(m_PathCalcObjects(iCount))
  next 'Return New Path
  set CopyPath = myNewPath
end function ' ----------------------------------------
' To String Method
' ----------------------------------------
public function ToString()
  ToString = "Path: "
  dim myPathObject
  for each myPathObject in m_PathCalcObjects
    if IsObject(myPathObject) then
      ToString = myPathObject.m_Object.Name &"("&myPathObject.m_CalcCount&")"& " -> " & ToString
    end if
  next
end function
end class
```

FIG. 9L

Initialize Object List:
```
'Tests if Object is In Collection
public function IsObjectInCollection(myCollection, myObject)
  IsObjectInCollection = false
  if myCollection is nothing then
    exit function
  end if dim myObj
  for each myObj in myCollection
    if myObj = myObject then
      IsObjectInCollection = true
    end if
  next
end function
```

FIG. 9M

```
'Get Objects from Package
public function AddMyObjectsFromPackage(myPackage, myTargetCollection)
  'Add Objects
  dim myObject
  for each myObject in myPackage.Tables
    if InStr(myObject.Name, "_Historical") > 0 then
      'do nothing - exclude Historical Tables here
    else
      if myObject.IsShortcut() = true then
        'do nothing - we do not want shortcuts
      else
        if IsObjectInCollection(myTargetCollection, myObject) = false then
          myTargetCollection.Add myObject
        end if
      end if
    end if
  next 'Iterate through other objects
  dim mySubPackage
  for each mySubPackage in myPackage.Packages
    AddMyObjectsFromPackage mySubPackage, myTargetCollection
  next
end function
```

Define As Important
```
Sub %Method%(obj)
  if obj.IsShortCut() then
    set obj = obj.TargetObject
  end if dim myDiagram
  set myDiagram = ActiveDiagram dim myPackage
  set myPackage = myDiagram.Folder 'Calc Objects
  dim myCalcObjectCollection
  set myCalcObjectCollection = myPackage.GetExtendedCollection("Targets")

myCalcObjectCollection.Add(obj)

dim mySymbol
  set mySymbol = myDiagram.FindSymbol(obj,true)
  mySymbol.FillColor = RGB(255,0,0)
End Sub
```
Remove from Calculation
```
Sub %Method%(obj)
  if obj.IsShortCut() then
    set obj = obj.TargetObject
  end if dim myDiagram
  set myDiagram = ActiveDiagram dim myPackage
  set myPackage = myDiagram.Folder 'Calc Objects
  dim myCalcObjectCollection
  set myCalcObjectCollection = myPackage.GetExtendedCollection("CalculationObjects")

myCalcObjectCollection.Remove(obj)

dim mySymbol
  set mySymbol = myDiagram.FindSymbol(obj,true)
  myDiagram.Symbols.Remove(mySymbol)
End Sub
```

FIG. 9N

PATH GENERATION AND SELECTION TOOL FOR DATABASE OBJECTS

CROSS REFERENCE TO RELATED APPLICATION

This application is a continuation of, and incorporates by reference, U.S. patent application Ser. No. 16/027,010, filed Jul. 3, 2018.

FIELD

The present disclosure generally relates to analyzing relationships between data. Particular implementations relate to analyzing paths between database objects, such as tables or views, including for selection of a path connecting two or more database objects.

BACKGROUND

As computers become more ubiquitous, increasing amounts of data become available for retrieval and analysis. Data is typically segregated in some manner, such as being placed in different files or repositories. In a relational database, data is typically segregated by tables, also referred to as relations or entities. In some cases, tables can be organized to correspond with analog world objects and processes. For instance, different tables may be created for a product to be manufactured, components used in the product, component supplier information, scheduling information, and other aspects of a manufacturing process. As a data model becomes more complex, it can be difficult to determine how to retrieve data, particularly to retrieve data in an efficient manner. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for determining, evaluating, and selecting data retrieval pathways. A plurality of database objects, such as tables, can be retrieved, and relationships between them determined. The relationships are between various attributes of the database objects. A plurality of pathways are determined between at least two target database objects, where the path determination does not consider attribute-level relationship information. After a path is determined, the relationship-level information can be added. A summary of the path, and relationship information, can be displayed to a user. A user can select paths to remove from the display, and can indicate one or more database objects that are required for a valid path, one or more database objects that are prohibited from valid paths, or combinations thereof. A user can select a path, and a query language statement to implement the path can be generated and displayed to the user.

A method is provided for determining relationships between database objects, such as tables or views. Identifiers are determined for a plurality of database objects, such as tables or views. The identifiers, such as a name for a table or view, can be used to access the database objects in the database, or access data associated with the database objects, such as schema information (e.g., information defining attributes, including names and data types, for the database objects, and information, such as foreign key or association relationships, with other database objects).

A plurality of relationship identifiers for the plurality of database objects are determined. A relationship identifier, such as a foreign key or an association (e.g., a reference to an alternate key), specifies an access pathway for a database object of the plurality of objects to retrieve data from, or access data in, another database object of the plurality of database objects. Each database object of the plurality of database objects is connected to at least one other database object of the plurality of database objects through a relationship identifier of the plurality of relationship identifiers.

An identifier is received for a first target database object of the plurality of database objects and at least a second target database object of the plurality of database objects, where paths are to be determined between the first database object and the at least a second database object. An identifier for at least a third database object is received. A status identifier is also received for the at least a third database object. The status identifier indicates whether the third database object must be included in paths between the first database object and the at least a second database object or whether the third database object must not be included in paths between the first database object and the at least a second database object.

A first plurality of paths are determined between the first database object and the at least a second database object. At least a first path of the first plurality of paths that satisfies the status identifier is determined. A display is rendered that includes an identifier of the at least a first database object, an identifier of the at least a second database object, a display of the at least a first path, and at least a fourth database object that is located on the at least a first path.

According to another embodiment, a method is provided that can be carried out by a pathway determination tool. A specification of database tables to be analyzed is retrieved. The specification can be a package that includes a name, reference, or other table identifier that can be used to retrieve table data or metadata. Schema data for the database tables is retrieved, such as using the identifiers in the table specification. The schema information includes foreign key and association identifiers (e.g., references to alternate keys) indicating relationships between the database tables. For a given table, a first set of one or more attributes serves to make the table a referenced or referencing table (e.g., a primary key that can be used to reference the table or a foreign key that can be used to reference another table). A second set of one or more attributes serves to make the table a referenced or referencing table. At least one attribute of the first set differs from an attribute of the second set.

The database tables are represented as a graph. The database tables are represented as nodes and the foreign keys and association identifiers are used to define edges between the nodes, where, for a given direction, a single edge connects a pair of related nodes. That is, the edges do not indicate attributes associated with the foreign keys or associations. An indication of two or more target tables is received, where a plurality of paths is to be calculated between the nodes representing the target tables. A plurality of paths are calculated between the two or more target tables. For the calculated paths, nodes are related using their corresponding foreign keys and association identifiers. Identifiers for tables corresponding to nodes in the calculated paths and linkages between the tables corresponding to the foreign keys and the association identifiers are rendered for display.

According to a further aspect, a method is provided for generating a query language statement representing a path between first and second database tables, the path including at least one additional database table. A specification of database tables to be analyzed is retrieved. The specification can be a package that includes a name, reference, or other table identifier that can be used to retrieve table data or metadata. Schema data for the database tables is retrieved, such as using the identifiers in the table specification. The schema information includes foreign keys and association identifiers (e.g., references to alternate keys) indicating relationships between the database tables. For a given table, a first set of one or more attributes serves to make the table a referenced or referencing table (e.g., a primary key that can be used to reference the table or a foreign key that can be used to reference another table). A second set of one or more attributes serves to make the table a referenced or referencing table. At least one attribute of the first set differs from an attribute of the second set.

The database tables are represented as a graph. The database tables are represented as nodes and the foreign keys and association identifiers are used to define edges between the nodes, where, for a given direction, a single edge connects a pair of related nodes. That is, the edges do not indicate attributes associated with the foreign keys or associations. An indication of two or more target tables is received, where a plurality of paths is to be calculated between the nodes representing the target tables. A plurality of paths are calculated between the two or more target tables. For the calculated paths, nodes are related using their corresponding foreign keys and association identifiers. Identifiers for tables corresponding to nodes in the calculated paths and linkages between the tables, corresponding to the foreign keys and the association identifiers, are rendered for display.

User input selecting a path of the calculated paths is received. Query language operations to implement the path are determined. A query language statement that includes the query language operations is output for display. In some cases, the query language operations can be executed to retrieve data from a database system that includes the one or more target tables and one or more tables in the selected path.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 9A-9N present example VBSCRIPT™ code providing an example implementation of disclosed technologies.

DETAILED DESCRIPTION

Example 1

Overview

Figure 1:
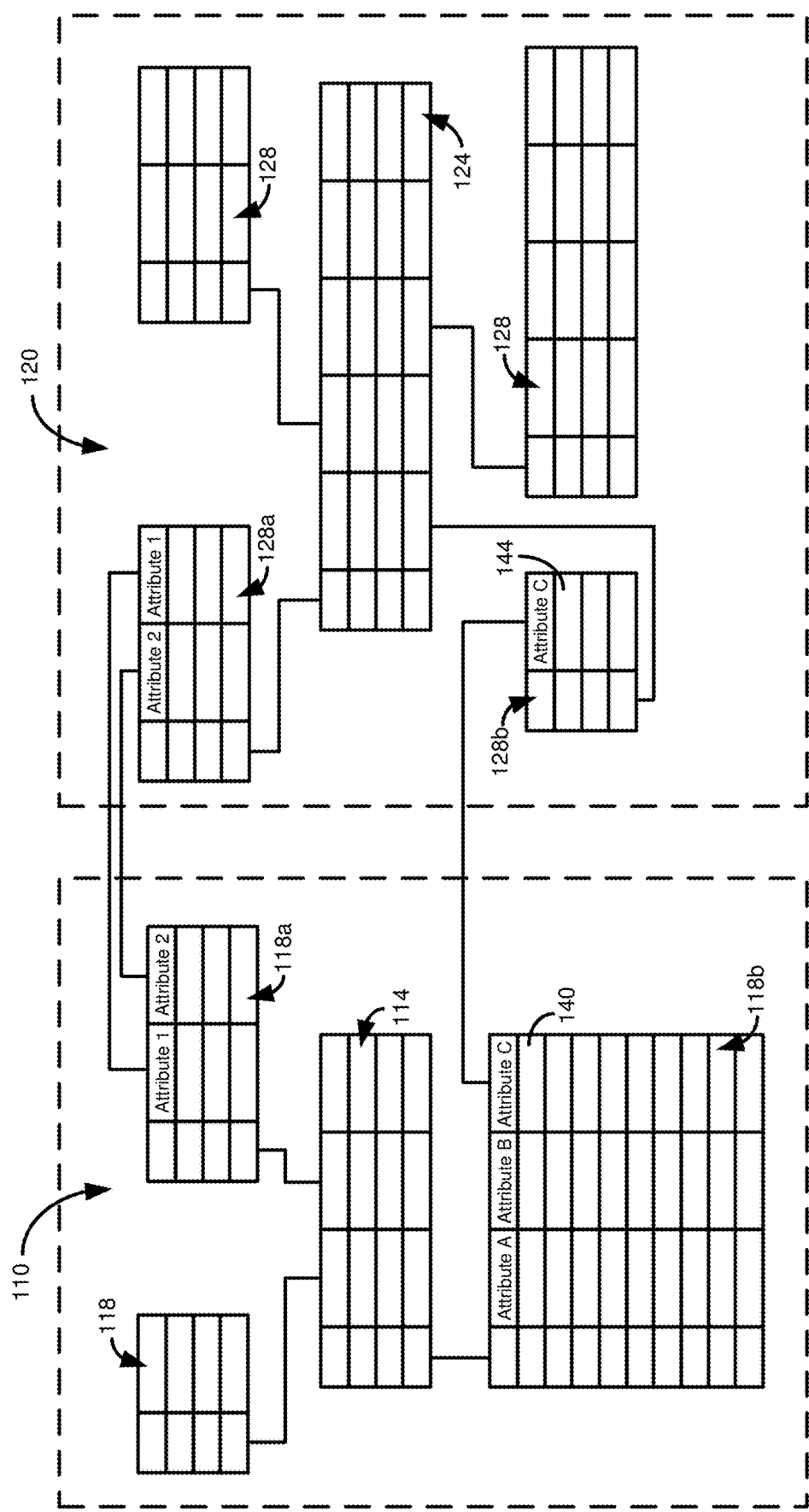
FIG. 1 is a diagram of a data model illustrating how multiple star schemas can be related.

As computers become more ubiquitous, increasing amounts of data become available for retrieval and analysis. Data is typically segregated in some manner, such as being placed in different files or repositories. In a relational database, data is typically segregated by tables, also referred to as relations or entities. In some cases, tables can be organized to correspond with analog world objects and processes. For instance, different tables may be created for products to be manufactured, components used in products, component supplier information, scheduling information, and other aspects of a manufacturing process. As a data model becomes more complex, it can be difficult to determine how to retrieve data, particularly to retrieve data in an efficient manner. Accordingly room for improvement exists.

Database normalization can be used to break up larger tables into a larger number of smaller tables. Normalization can provide various benefits, including making storage or memory use more efficient and reducing the chances of data inconsistencies. However, a larger number of tables can increase data model complexity and can increase the number of tables that need to be joined to retrieve needed information. In addition, in some cases, attributes of one table can be linked to another table through a path that includes one or more additional tables.

For some use case scenarios, such as data analysis (e.g., OLAP queries versus OLTP operations), normalization can be relaxed. For example, data inconsistencies may be less of a concern if records are unlikely to be modified. A common data schema for use with OLAP queries is a star schema, where a central fact table includes facts or measures, such as for particular transactions, and one or more dimension tables that store attributes that describe aspects of transactions. Queries can be particularly complex when they retrieve information from multiple star schemas.

For the reasons set forth above, retrieving data from multiple tables can be complex. Complexity can be reflected in the commands (e.g., SQL statements) needed to retrieve the data. In addition, as different pathways can exist to retrieve the same data (e.g., using a larger or smaller number of intermediate tables), the tables selected for a query can affect both the complexity of the SQL statement and the resources (e.g., memory, CPU, time, network bandwidth) needed to process the query. However, it can be complex to even compose the SQL query.

That is, for example, a database may contain hundreds or thousands of tables, each having multiple attributes. The tables may be associated with one another in various ways, including through foreign key relationships or associations. Thus, the tables may be linked together in a variety of pathways. Data may be retrieved from a table in various ways, such as using a primary key or an alternate key. Before a query can be executed, typically a human being must analyze the data model and determine how to construct the query—which attributes should be accessed, in what manner, and using what pathways between tables. Even for someone with extensive knowledge of a database schema, it can be challenging to determine how to retrieve particular data, much less retrieve that data in an efficient manner.

As an example, a particular application that interacts with a database system may include 305 tables. There may be 569 different pathways, or linkages, between the tables. For a pair of tables A and B, there can exist 1060 possible pathways to get from table A to table B. As can be imagined, even for someone with extensive knowledge of the application and the database schema it uses, trying to pick pathways between two tables out of 305 tables, with so many linkages, can be extraordinarily time consuming. Finding all possible paths may simply be not feasible, much less comparing path costs to determine which pathway may be most efficient. Even when a pathway is identified, a user typically must manually construct a SQL statement to obtain the relevant data. Constructing the SQL statement can be complex, time consuming, and error prone.

Disclosed technologies provide for automated path determination for database operations, such as a query involving a plurality of tables or other database objects (e.g., views or synonyms). The technologies can represent a given database schema as a graph. Individual tables can be represented as nodes or vertexes in the graph, and relationships between tables can be represented as edges.

In at least some aspects, one or more of the tables are connected by multiple edges. For example, multiple pathways may exist to through a single set of one or more attributes of a table (e.g., one or more tables may use the single set as a foreign key or an association to an alternate key). Or, pathways may exist through different sets of one or more table attributes (e.g., one table can use a foreign key and another table can use an association to an alternate key).

A path determination method can determine paths between tables, and a final result can be displayed, or automatically analyzed, that includes information regarding edges particular sets of one or more attributes in each of the two connected tables. Considering multiple entry points to a table can facilitate a user in selecting a path that can be best suit their needs, and can also facilitate automatic generation of operations (e.g., a SQL statement) for implementing a particular pathway. Allowing for a larger number of paths to be analyzed, and including more granular path information, can increase efficiency by allowing a user to select path with a reduced number of nodes needed for a query, or otherwise choose a path that increases efficiency or best suits a user's needs.

The availability of multiple paths can increase efficiency allowing tables to be chosen that can most efficiently be searched. For example, a longer path that includes tables with a smaller number of records may be more efficient than a shorter path that includes a larger number of records. Or, tables can be chosen because they are located in physically proximity (e.g., on the same computing node/server) or on a node/server with faster performance compared with other nodes/servers.

Tables in a particular path can also be chosen based on other considerations, such as to reduce privacy or security concerns. For example, if one path accesses a table with confidential or protected data, it may be preferable to choose a path that does not include such data. In other cases, it may be preferable to choose a path that does include a certain table. For example, if it is known that including a certain table in a path produces an efficient result compared with other options, it may be desirable that any paths to be further considered require that path. Stated another way, the disclosed technologies can incorporate a "black list," where certain nodes may not be on a final path, and/or a "white list," where certain nodes must be on a final path.

Disclosed technologies can also facilitate a user in selecting a particular path. That is, disclosed technologies can provide a user with multiple paths that are available. A display of path information can be provided, such as a list of tables included in the path, particular path linkages that are used in the path, and, optionally, an estimate or measure of path cost (such as expected query execution time, memory use, or number of tuples processed). A user may select a path of the displayed paths for use. In at least some aspects, selection of a path can generate commands, such as a SQL statement, to execute database operations using the path.

Disclosed technologies can also allow a user to refine paths for further analysis or consideration. For example, a user can select one or more tables to be placed on a white list, one or more tables to be placed on a black list, or a combination thereof. The user can then be presented with remaining paths that satisfy the criteria. If desired, in addition to, or instead of, adding nodes to a white or black list after path calculation, the nodes can be added to a list prior to an initial path calculation. In either scenario, a user may iteratively add nodes to (or remove them from) a white list or black list in order to assist the user in selecting a path that best suits their needs.

In further aspects, other types of rules or path selection criteria can be specified. For example, it can be specified that a path should include more or less than a threshold number of nodes. Or, it can be specified that a path should or should not include a specified relationship (e.g., a particular pathway between particular tables). Performance criteria can also be specified, such as paths with a lowest number of tuples processed, a fewest number of joins, a fastest execution time, or meeting other criteria being preferred, or that only paths meeting the criteria should be displayed to the user. Performance or path criteria can also be used to automatically select a particular path. For instance, an optimized path can be selected that best matches path selection criteria and that path implemented, or implementation details (e.g., a SQL statement) provided to a user without the user interactively reviewing available path options.

As described, the disclosed subject matter can provide various advantages. The disclosed subject matter can provide database access operations that more efficiently use computing resources, and execute faster. Disclosed technologies can increase data security by allowing tables to be specified that should not be accessed by a query. Disclosed technologies can facilitate path determination, selection, and implementation, which can reduce user effort required in implementing a data retrieval procedure.

Example 2

Example Relationships Between Star Schemas

FIG. 1 schematically depicts two star schemas 110, 120. Star schema 110 includes a central fact table 114 and three dimension tables 118. Star schema 120 includes a central fact table 124 and four dimension tables 128.

In order to obtain data from multiple star schemas, a dimension table that is common to both fact tables is used to bridge the two schemas. In some cases, such bridging can occur if one dimension table is a subset of the other dimension table (e.g., one table contains all the attributes of the other, plus one or more additional attributes). In further cases, bridging can occur as long as at least one attribute is shared, or conformed, between the two star schemas.

For example, in FIG. 1, dimension table 118a is identical to dimension table 128a (other than, potentially, a record ID or other means of identifying tuples that does not convey substantive information). Or, rather than having duplicate tables, dimension table 118a and dimension table 128a can be the same table, but represented as members of multiple star schemas. Each attribute in the dimension tables 118a, 128a can serve as a pathway between facts in fact table 114 and facts in fact table 124. However, each of these pathways is different, in that different attributes are linked together. It can be important which attributes are used to link dimension tables 118a and 128a. For example, operations (e.g., specified by a SQL statement) to implement the pathways may be different. Additionally, some of the pathways may use indexed attributes, while others do not, which can affect the execution speed of a particular pathway.

In the example scenario of FIG. 1, an alternate way of obtaining facts from fact tables 114 and 124 is through the use of attribute 140 of dimension table 118b and attribute 144 of dimension table 128b. However, as shown in FIG. 1, table 118b includes a larger number of tuples than table 118a, which can result in a path involving table 118b having a longer execution time, and requiring more computing resources, than a path involving table 118a.

Example 3

Example Table Relationships Using Primary and Alternate Keys

Figure 2:
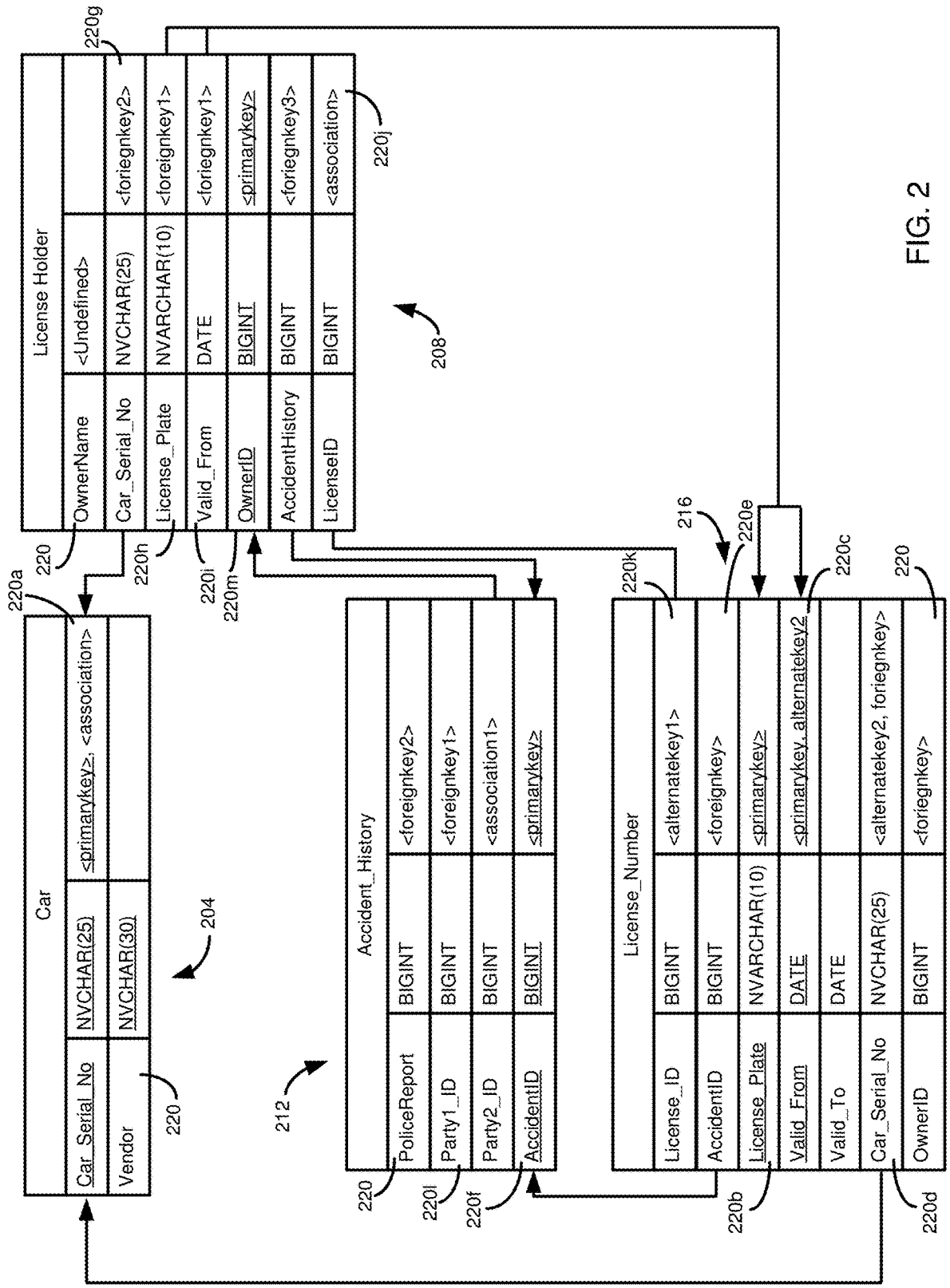
FIG. 2 is a diagram of a data model illustrating how tables can be related by foreign keys or associations, and how multiple pathways between tables can exist.

FIG. 2 schematically depicts how tables can be connected via multiple pathways, and how pathways can be through different table attributes. FIG. 2 illustrates a table 204 representing a car, a table 208 representing a license holder (e.g., a driver having a driver's license), a table 212 providing an accident history, and a table 216 representing a license number (e.g., associated with a license plate).

Each of the tables 204, 208, 212, 216 has a plurality of attributes 220 (although, a table may only have one attribute in some circumstances). For a particular table 204, 208, 212, 216, one or more of the attributes 220 can serve as a primary key—uniquely identifying particular records in the tuple and being designated as the main method of accessing tuples in the table. For example, in the table 204, the Car_Serial_No attribute 220a serves as the primary key. In the table 216, the combination of attributes 220b and 220c together serve as the primary key.

A table can reference records associated with the primary key of another table through the use of a foreign key. For example, the license number table 216 has an attribute 220d for a Car_Serial_No in table 216 that is a foreign key and is associated with the corresponding attribute 220a of table 204. The use of a foreign key can serve various purposes. The foreign key can link particular tuples in different tables. For example, a foreign key value of 8888 for the attribute 220d would be associated with a particular tuple in table 204 having that value for attribute 220a. Foreign keys can also act as constraints, where a record cannot be created having (or altered to have) a foreign key value that does not exist as a primary key value in the referenced table. Foreign keys can also be used to maintain database consistency, where a change to a primary key value can be propagated to table where the attribute is a foreign key.

A table can have other attributes, or combinations of attributes, that can serve to uniquely identify tuples, but which are not primary keys. Table 216, for instance, has an alternate key that is formed from attribute 220c and attribute 220d. Thus, a unique tuple can be accessed in the table 216 using either the primary key (e.g., being a foreign key in another table) or through an association to the alternate key.

In the scenario of FIG. 2, it can be seen that multiple pathways exist between tables. For example, consider an operation that is to collect data from table 216 and table 208. One pathway is to move from table 216 to table 212 using the foreign key 220e. Then, table 208 can be reached through the foreign key relationship of attribute 220l of table 212 to the primary key 220m of table 208. Alternatively, table 208 can be reached from table 216 through table 204, since table 216 has an attribute 220d that serves as a foreign key for the primary key 220a of table 204, and attribute 220 is also an associate to the alternate key of attribute 220g of table 208.

In the above scenario, both paths have the same length, but link to different attributes of table 212. The scenario of FIG. 2 is relatively simple, so it can be seen that as the number of tables in a data model increases, the number of possible paths can increase greatly, making determining any path, much less the most efficient path for a particular scenario, complex. In addition, even between two tables, multiple, different pathways can exist. For example, table 208 can access tuples of table 216 through the foreign key attributes 220h, 220i of table 208, accessing primary key attributes 220b, 220c of table 216, or using the association provided by attribute 220j of table 216 which references attribute 220k, an alternate key of table 216. Although the ultimate path is different, table 208 to table 216, the paths are different in that different attributes 220 are connected.

If the tables 204, 208, 212, 216 were represented in a graph, each table may be a node. Paths between tables 204, 208, 212, 216 can be edges, which can be unidirectional or bidirectional. However, different paths between tables form different edges. Again using the path between tables 208 and table 216 as an example, the path through the foreign key attributes 220h, 220i is a different edge than the path through the association attribute 220j.

Example 4

Example Graph Representation of Database Objects and Graph Traversal

FIG. 3 illustrates a graph 300 that includes a plurality of nodes 308, where each node 308 is connected to one or more other nodes through one or more edges 312. Edges 312 may be bidirectional or unidirectional. The nodes 308 can represent data sources, such as tables in a relational database. The edges 312 can represent relationships between tables. For example, an edge 312 can represent a primary-foreign key relationship, an association-alternate key relationship, or some other relationship.

Each of the nodes 308 is segmented into multiple sections 316. Each section 316 can represent a different attribute (or column or field) of a table. Some of the sections 316, such as sections 316a, can be unidirectionally connected to one or more attributes of one or more other nodes 308. Other sections, such as sections 316b, can be bidirectionally connected to one or more attributes of one or more other nodes 308 (e.g., an attribute can be both a foreign key or association and an a primary key or alternate key). Additional sections 316, such as sections 316c, are not (at least currently) connections to other nodes 308.

In at least some aspects, unidirectional edges, such as edges 312a, can allow a node 308 connected to the tail of an edge to retrieve information from the node connected to the head of the edge. For unidirectional edges 312a, the node 308 connected to the head is typically not able to retrieve information from the node at the tail, at least not through that edge.

For example, a node 308 connected to the head may have a primary key that is an attribute 316 that services as a foreign key for a node connected to the tail of the edge 312a. The primary key serves to uniquely identify data (e.g., rows, records, or tuples of a relational database table) of the node 308 proximate the head. However, in at least some cases, the primary key of the source node 308 does not uniquely identify data of the target node, the node proximate the tail.

In some cases, the primary key of the source node 308 (which can be a target node that is a starting point for a path) can uniquely identify data of a destination node (which can be a target node that is a destination or ending point for a path), such as when the primary key of the source node is also the primary key or an alternate key of the destination. Additionally, in some aspects, although the foreign key used by a node 308 may not be a primary key, it may be part of a super key (including a candidate key, which can be the primary key), or alternate key, of the node.

The primary key (or other type of key) of a node 308 may include attributes that reference attributes of multiple other nodes. For example, the primary key of a node 308 may include a first attribute from a first referenced node, such as using a foreign key or an association to an alternate key of such node, and a second attribute from a second referenced node, such as a foreign key or an association to an alternate key of such second referenced node.

FIG. 3 illustrates seventeen nodes 308. For large database systems, such as are common for ERP applications, the number of nodes may be orders of magnitude larger. However, even for the comparatively small number of nodes 308 in FIG. 3, it can be seen that multiple pathways exist between any given node 308. As has been described, even for someone with knowledge of the nodes 308 and their relationships, it can be difficult to determine a route, all routes, or a best route between two nodes, at least if the nodes are not directly connected.

Disclosed technologies can assist in identifying one or more pathways for obtaining data from at least a first node 308 and at least a second node. Pathways can be identified by representing nodes in a data structure, such as a graph data structure that includes the nodes 308 and connecting edges 312. In some cases, the edges 312 can have one or more weights (e.g., a weight value, a vector of weight values, or a composite or abstract data type that includes one or more values). Weights can represent costs, such as network, memory, or CPU costs that would be incurred, a number of tuples processed, query complexity, or other measures of edge (and therefore path) desirability. In other cases, pathways can be determined without the use of weights.

In particular aspects, a graph traversal method is used to determine one or more paths between two or more specified nodes 308. In some cases, the traversal can determine all paths, while in other cases the traversal method can determine a subset of paths, such as a shortest path (where shortest can refer to a smallest number of nodes traversed or smallest with respect to one or more weights, or a cost function that includes multiple weights). In a particular example, a depth-first search is used to determine paths between two given nodes. In a more particular example, the depth-first search considers a single edge between pairs of nodes in a prospective path, even if multiple edges exist when considered at attribute-level granularity. Once paths are determined, attribute-level edge information can be added to the path information so that such edge information is not lost.

Figure 3A:
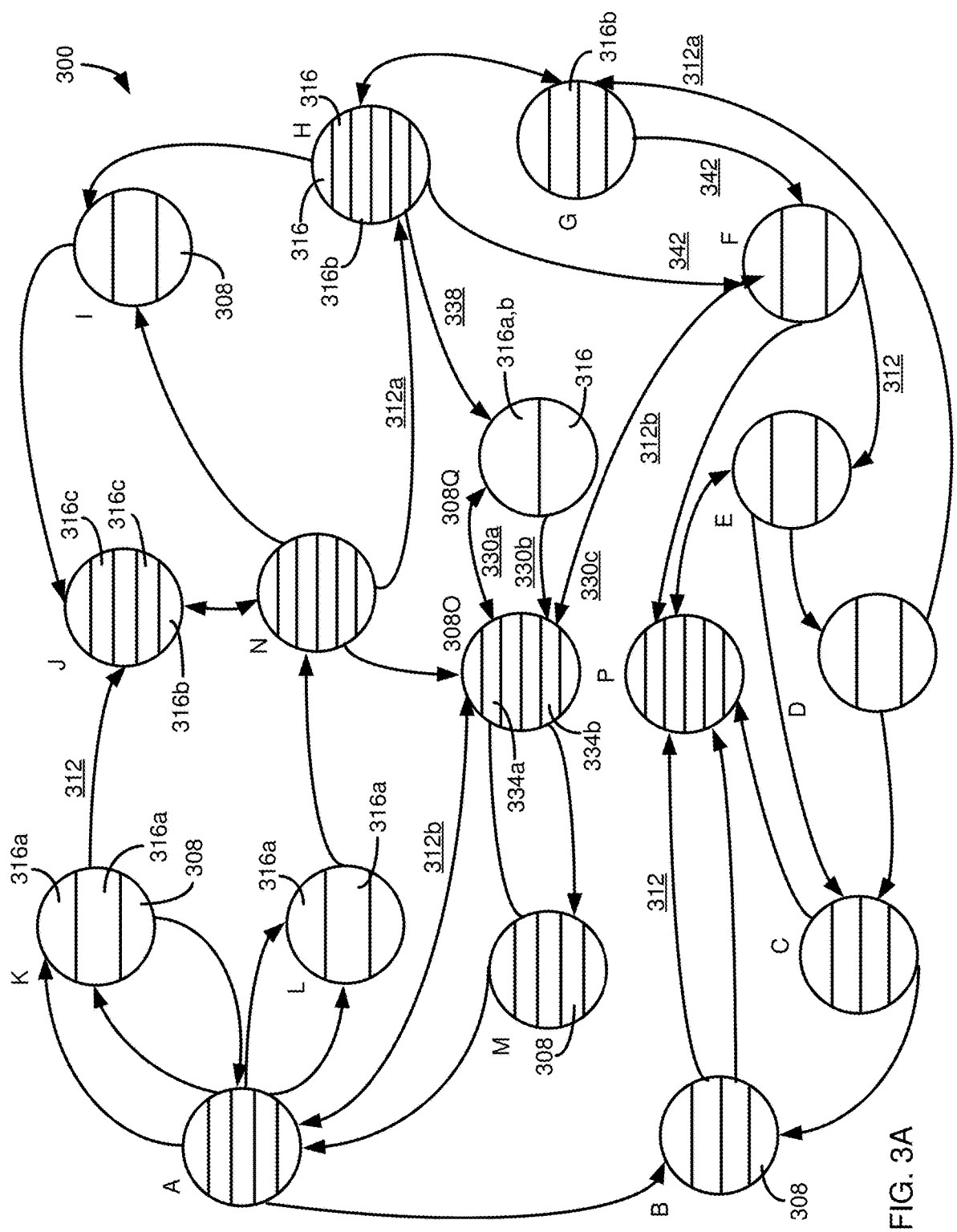
FIG. 3A is a schematic representation of a network of nodes, representing database objects, such as tables, and how multiple pathways can exist between nodes, including through edges connecting to different node attributes.

To illustrate how different edges 312 can be used to distinguish paths, in FIG. 3A, a node 308O is connected to a node 308Q by edge 330a. Edge 330a connects to attribute 334a of node 308O. Attribute 334b is connected to nodes 308Q and 308F by edges 330b and 330c, respectively. If node 308O is a terminating or target node in the path (e.g., the starting or ending node), a path through edge 330a would not be considered equivalent to a path through edge 330b, because the edges connect to different attributes of node 308O. Among other things, a request to retrieve or modify data, such as a SQL statement, would typically be constructed differently depending on whether attribute 334a or attribute 334b was being accessed (e.g., SELECT . . . WHERE ATTRIBUTE334A=VALUE versus SELECT . . . WHERE ATTRIBUTE334B=VALUE).

Similarly, if node 308O was not a terminating node, paths through edges 330a or 330b, 330c would not be considered equivalent, at least in a final path determination, or when operations are generated to define a particular path (e.g., one or more SQL statements). First, other portions of the paths would typically be different. For example, traversing edge 330a would require a path that includes edge 338. Traversing edge 330c would require a path that includes one of edges 342. So, a path through edge 338 may have a different length (e.g., number of nodes) or cost than a path through an edge 342. Second, operations to access data, such as SQL statements, via the paths would be different.

Graph traversal algorithms typically assume that edges 312 between nodes 308 are equivalent. That is, if an edge accesses a first node, that access is equivalent to the access of an edge from any other second node that accesses the first node. Similarly, typical traversal methods assume that two nodes are connected by one edge (which could be unidirectional or bidirectional). In the event these conditions hold true, such typical graph traversal methods can be used, as well as other methods, such as Dijkstra's algorithm or the use of spanning trees (including minimum spanning trees) can be used for path calculations. However, in at least some cases, a traversal method is used that finds more than just the shortest available path, such as all paths, or a subset of all paths that includes more than a single path, including a subset of paths that are noncyclical or which satisfy other constraints (e.g., cost constraints, constraints on which nodes may or may not be in a path). Once paths are determined, attribute-level edge information can be added to the paths.

Pseudocode for a suitable traversal method is:
Start at the first target node (e.g., a starting node for the path);
Get a list of all nodes immediately reachable from the first target node;
Call the depth-first search method recursively for each node of the list;
  If the node is the second target node, mark all nodes in the found path as searched (such as using a flag or Boolean value);
  If the node has the calculated flag set, save the current path, and return to the previous node in the path;
  Otherwise, traverse all nodes connected to the current node;
Remove all nodes that are not part of a saved path; and
Add all possible edges between the nodes.

In some cases, such as using the above pseudocode, a path finding method can determine a set of nodes that are reachable without considering how they are reachable. That is, a first connection to a node through a first edge to a first attribute is considered to be equivalent to a second connection to the node through a second edge to a second attribute. Once the set of reachable nodes has been determined, the edges between the nodes can be added. A visual depiction of the graph can be provided to a user, and the user may visualize how a given path may involve connections to different attributes of a particular table.

Figure 3B:
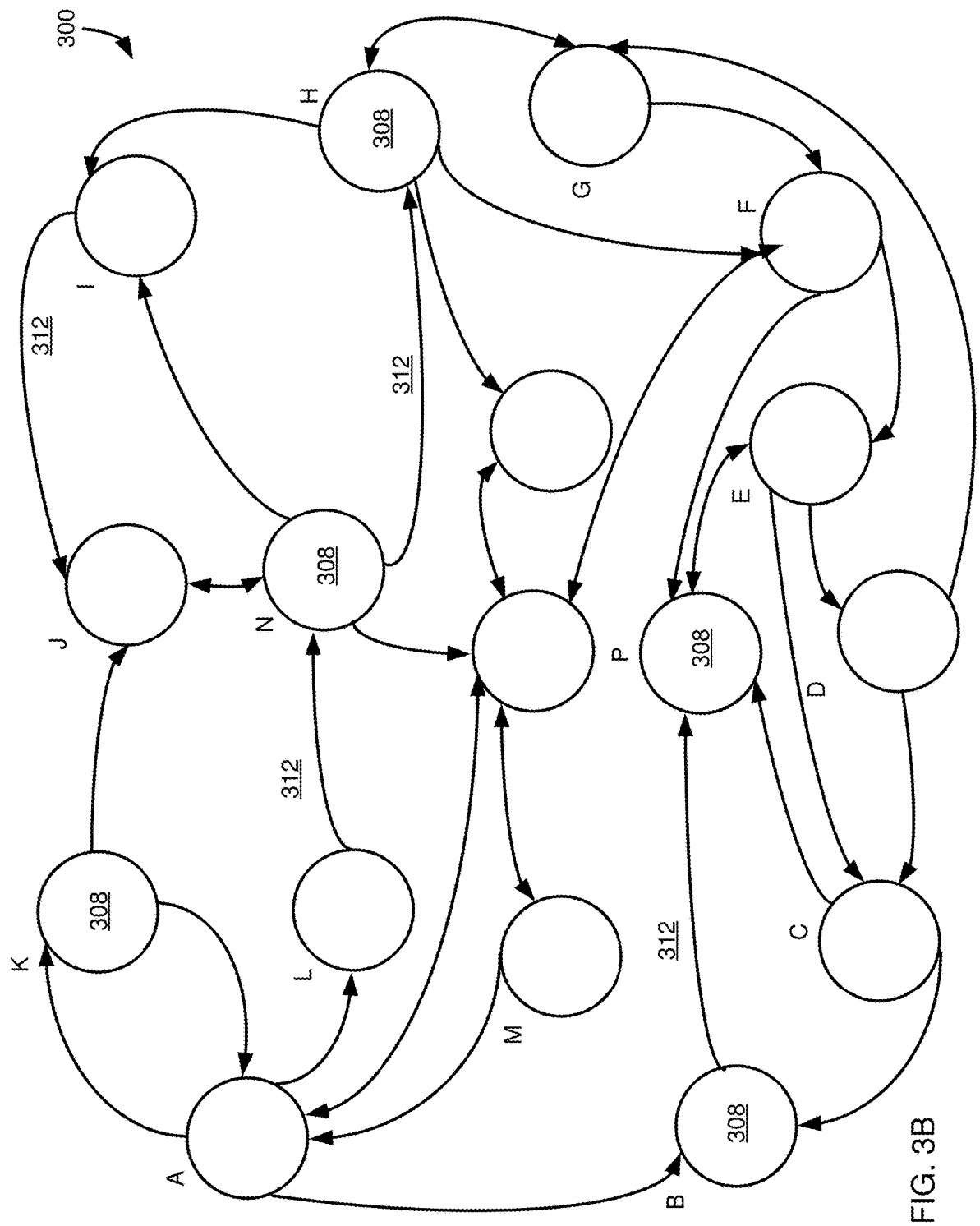
FIG. 3B illustrates the network of nodes of FIG. 3A, where a single edge connects related nodes and differences in connected attributes are not taken into account.

FIG. 3B illustrates the graph of 300 showing edges 312 between nodes 308, where it is not considered to which attribute(s) an edge connects, and multiple edges between nodes are reduced to a single edge. The above pseudocode can be used to determine paths between nodes. When the paths are to be displayed to a user, the individual edges between attributes can be added in to provide information as shown in FIG. 3A. The user can then determine which of the available paths are more suitable for their purposes, including considering which paths involve the fewest number of nodes, which paths may be more efficient, and paths that may include nodes that have information that may be of interest for a particular purpose (e.g., will be retrieved in a query that traverses the path).

In other aspects, a path determination method can distinguish between different edges to a particular node. For example, assume a node A has a first edge to a first attribute of a node B and a second edge to second attribute of node B. A path from node A to node B through the first edge can be considered different than a path from node A to node B through the second edge.

In some cases, a user can supply path constraints. For example, a user can specify nodes that must be on a path or that must not be on a path. Required nodes can be in the form of a white list prior to an initial path determination, or can be provided by a user (and added to a white list) after an initial path termination. Similarly, prohibited nodes can be provided in the form of a black list prior to initial path determination, or can be provided to a user (and added to a black list) after initial path determination. After an initial path has been determined, nodes can be indicated as required or prohibited in response to user input provided using a display of a current graph of nodes and their interconnections.

When a user selects one or more nodes to be required or prohibited, the paths between nodes can be recalculated and an updated graph, typically with fewer paths, and potentially fewer nodes, can be displayed to a user. The user can interactively designate nodes to be required or prohibited to reduce the number of paths displayed. The user can select a final path, which can result in the generation of operations, such as SQL statements, to implement the chosen path.

In typical traversal methods, nodes are not visited multiple times. However, in some aspects, a traversal method can visit a node multiple times. Visiting a node multiple times can be allowed, in some cases, when multiple edges exist to the node. Visiting a node multiple times can be allowed, in further cases, when a node is required to be on a path.

Consider a set of nodes A, B, C, M, and Z. Assume node A is connected to node B, node B is connected to node C, node C is connected to nodes M and Z, and node M is connected to node Z. If multiple visits to a node are not allowed, and node M is a required node, no path exists from node A to node Z, because the only way to node Z is through node C, and node C must be reached to visit node M. However, if multiple visits to a node are allowed, and node M is a required node, a path does exist from node A to node Z, although it involves node C being visited twice—from node B to node C and from node M to node C. In further aspects, a node can be visited multiple times so long as the visits occur through different attributes. For instance, in the above example, multiple visits to node C may be allowed if the edge from B to C connects to a first attribute of node C and the edge from M to C connects to a second attribute of node C.

As mentioned, in some cases, intermediate nodes can be specified as being required for a valid path or being excluded from a valid path. In one example, when a node is specified as being required, candidate paths are evaluated. When a candidate path is determined to connect a first target and a second target node (i.e., the endpoints of the path), it is determined whether the path includes all intermediate nodes that are required for a valid path (e.g., all nodes on a white list). If it does, the path is selected as a possible path and saved. If not, the path is discarded. However, sufficient path information can be saved (e.g., a flag is set) such that the same path is not reevaluated for a particular path determination instance.

In another example, when a particular node is specified as being prohibited for a valid path, calculation of a particular path stops as soon as a node is encountered that is on the list of prohibited nodes, or black list. That is, the path finding method does not iterate over nodes on the black list. In this way, no paths indicated as valid will include a prohibited node. In other aspects, black listed nodes are just remove from the set of available nodes.

Example 5

Example User Interface Screens

FIGS. 4-7 present example user interface screens according to an example embodiment of the disclosed technologies. The example user interface screens can allow a user to visualize paths between nodes, obtain path information (for example, nodes visited, node attributes accessed, and example operations for the path, such as SQL statements to implement the path).

Figure 4:
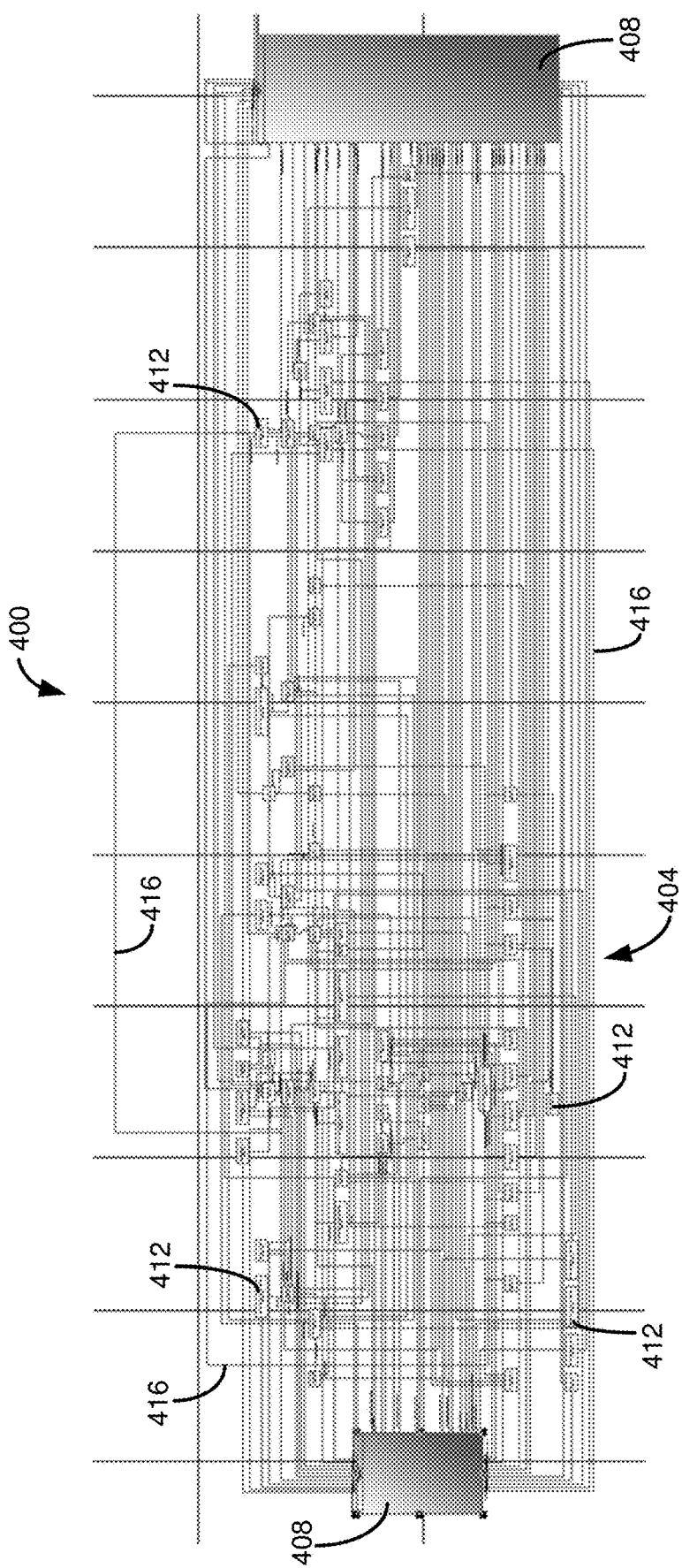
FIG. 4 is an example user interface screen illustrating multiple paths between two target nodes.

FIG. 4 illustrates a user interface screen 400 that illustrates a graph 404 of target tables 408 (e.g., tables having one or more attributes from which data is to be retrieved) and connecting tables 412. Connections 416 link pairs of target tables 408, connecting table 412, or combinations thereof. The graph 404 can include 80 tables from which connections 416 and pathways can be formed.

Each connection 416 typically indicates a unique edge in a path between the target tables 408 (e.g., between particular sets of one or more attributes of the tables connected by the edge). In some aspects, if a user selects a connection 416, the corresponding path or paths associated with the connection is highlighted. For example, the selected path by be enlarged, displayed in a different color, displayed in a different line width or pattern, highlighted, or otherwise visually distinguished from connections 416 of other paths. Selecting a path may also present operations, such as SQL statements, implementing the path. In some cases, a user may copy and paste the operations, or designate that the operations be used in a particular application.

A user may also select tables 412 or connections 416 to be placed on a list of required tables or connections or a list of prohibited tables or connections. For example, a user may perform a pointing action, such as right-clicking, on a node or connection to display a list options, which can include adding the node or connection to list of required nodes or connections or a list of prohibited nodes or connections. Or, user interface elements can be displayed to allow a user to tag tables 412 or connections 416 as being required or prohibited. In some cases, each time a table 412 or connection 416 is indicated as required or prohibited, paths in the graph 404 can be recalculated and displayed. In other cases, a user may make various annotations to the graph 404, and can be manually indicated (e.g., by selecting a "recalculate" icon) that recalculation should be performed. In still further embodiments, a user can add required or prohibited nodes to a table, and the information in the table can be used to recalculate paths in the graph 400, including when indicated by a user.

Figure 5:
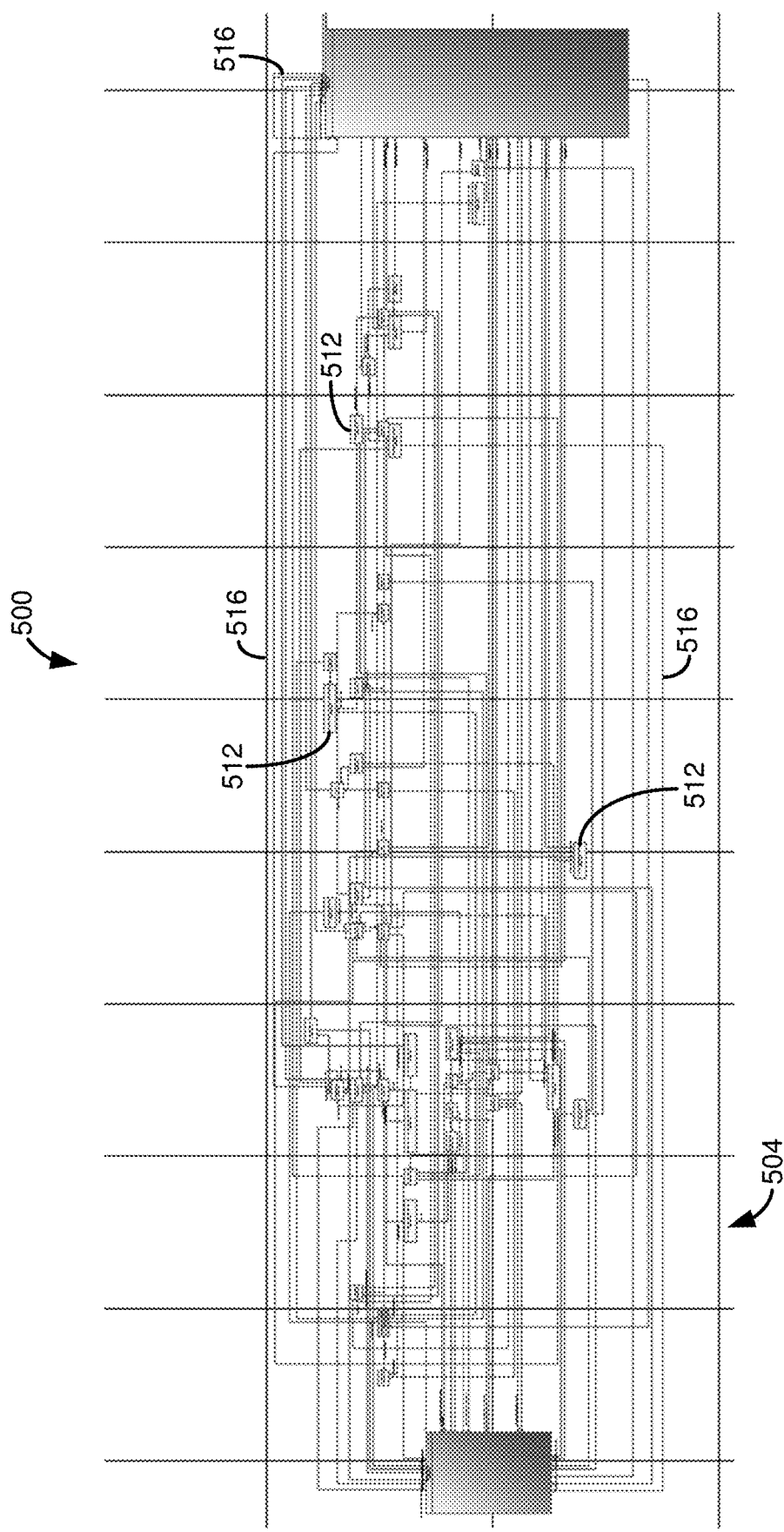
FIG. 5 is an example user interface screen illustrating how paths can be reduced between the target nodes of FIG. 4 by specifying a particular node as required for a path to be valid.

FIG. 5 illustrates a user interface screen 500 having a graph 504 that can be similar to the user interface screen 400 of FIG. 4. However, in FIG. 5, a single table has been added to a list of required tables. It can be seen that the number of connections 516, and consequently pathways, has been greatly reduced compared with FIG. 4. For example, while the graph 404 can have 80 tables, the graph 504 can have 44 tables 512—a reduction of almost half merely by marking a single table as required.

Figure 6:
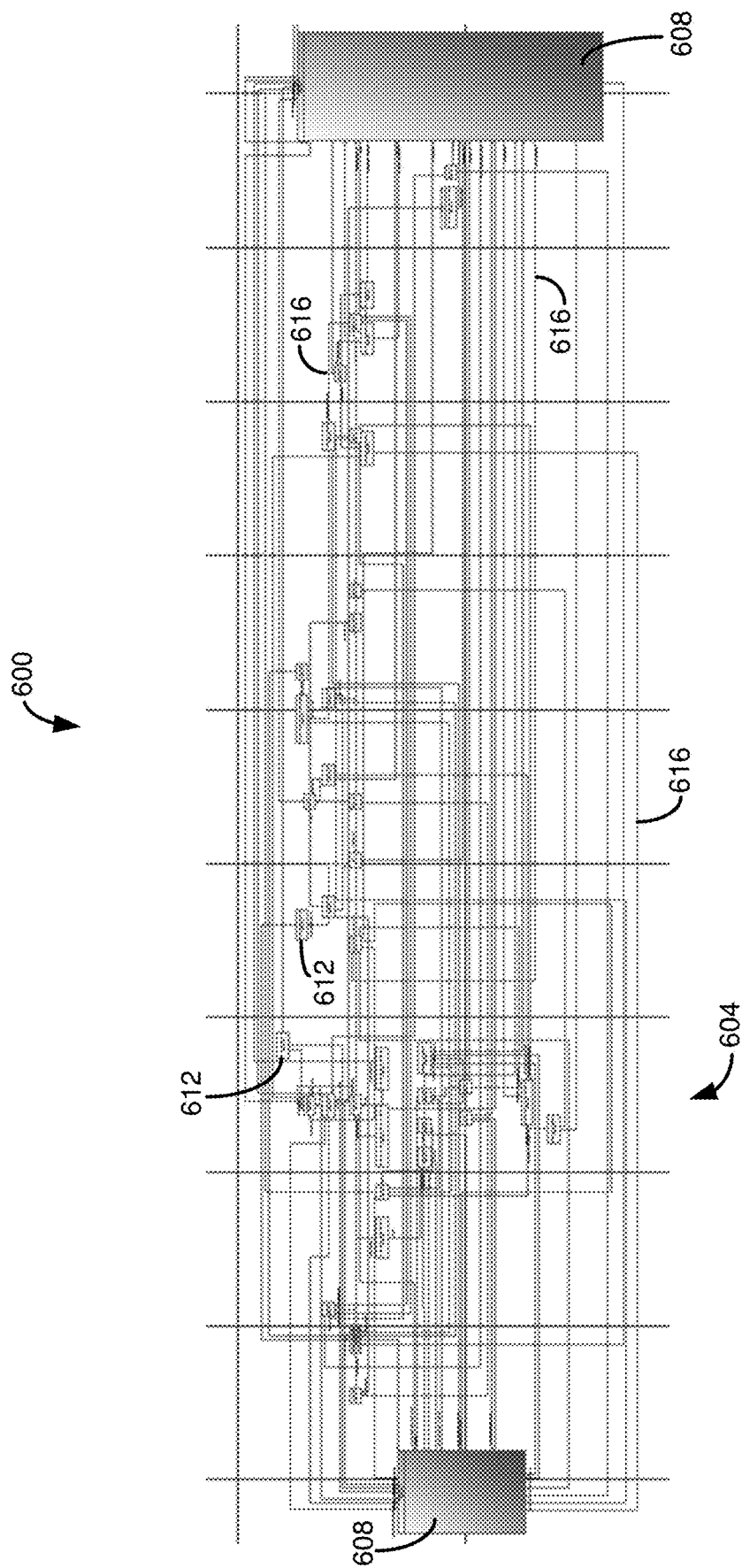
FIG. 6 is an example user interface screen illustrating how paths can be reduced between the target nodes of FIG. 4 by specifying a particular node as prohibited for a path to be valid.

Similarly, FIG. 6 illustrates a user interface screen 600, which can be similar to the user interface screen 400 of FIG. 4, having a graph 604. In the screen 600, a single table was added to a list of prohibited tables. Again, the number of connections 616 and intermediate tables 612, and consequently pathways, between target tables 608 has been greatly reduced compared with FIG. 4. For example, while the graph 404 can have 80 tables, the graph 604 can have 42 tables—a reduction of almost half merely by marking a single table as prohibited.

Figure 7:
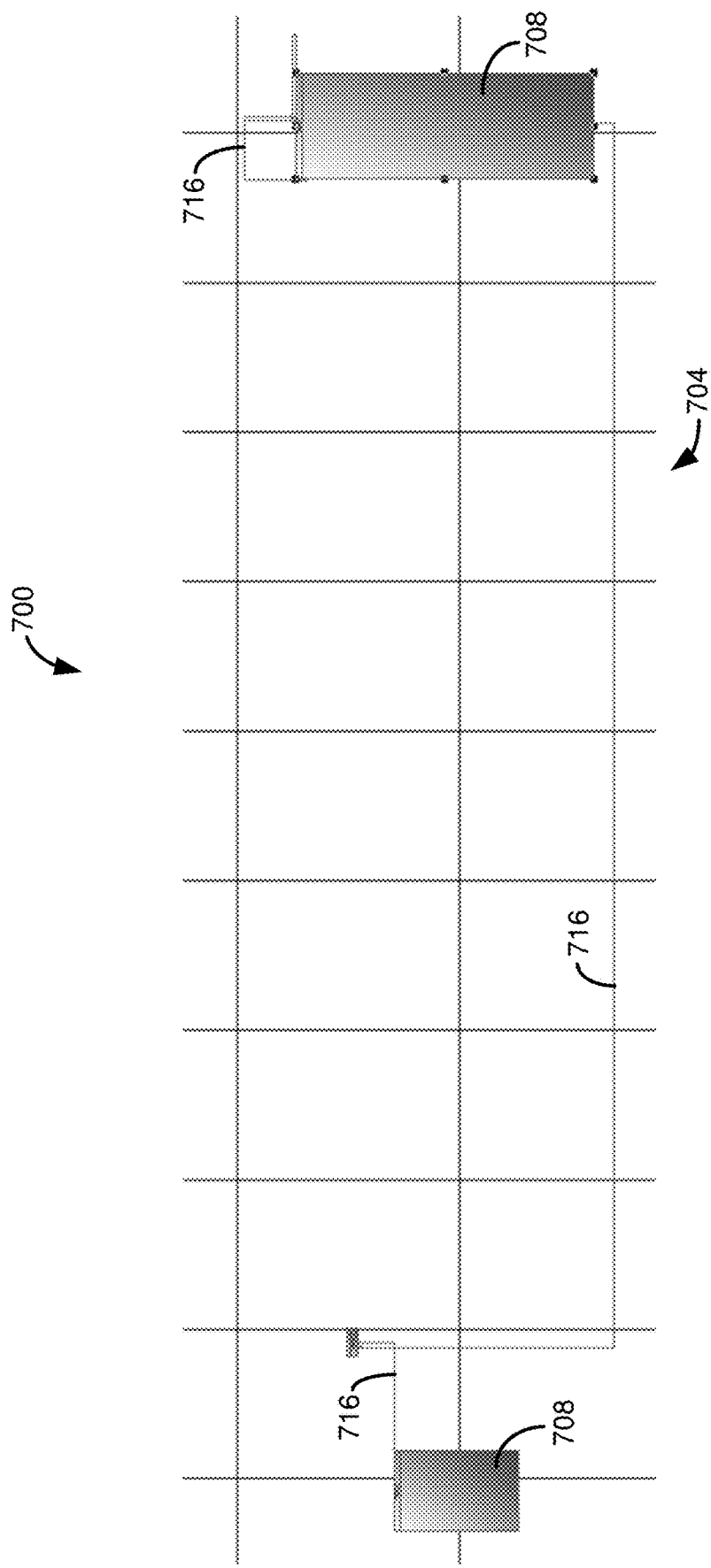
FIG. 7 is an example user interface screen illustrating how a user can eliminate paths from the paths of FIG. 4 in order to obtain a desired path.

FIG. 7 illustrates a user screen 700 that can be similar to the user interface screen 400 of FIG. 4. The screen 700 includes connections 716 for a single, selected path between target tables 708 of a graph 704. As described, an application providing, or associated with, the screen 700 can generate operations, such as SQL statements, to implement the selected pathway.

Example 6

Example Computing Environment for Path Determination and Selection

Figure 8:
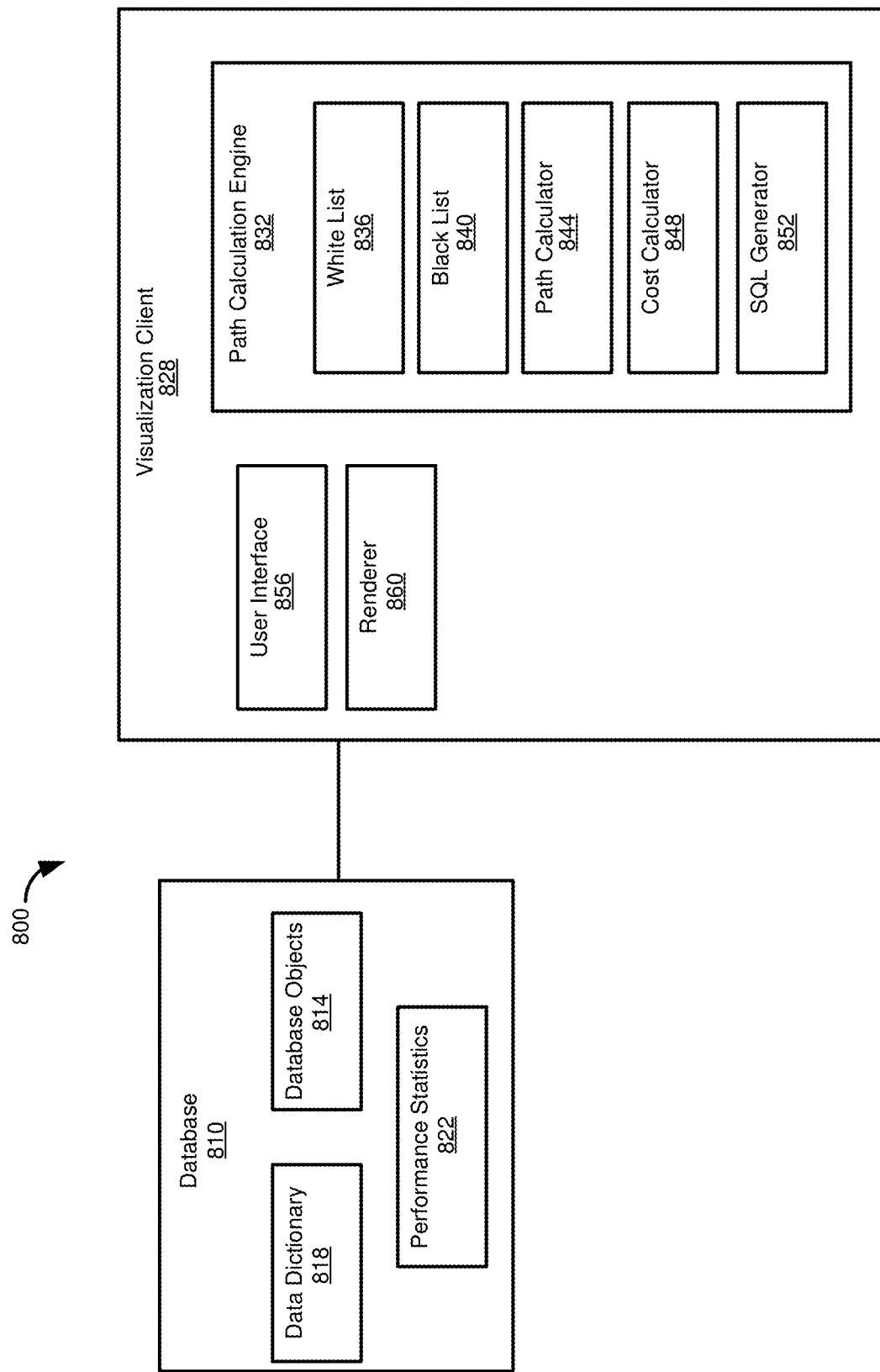
FIG. 8 is diagram illustrating an example computing environment in which disclosed technologies can be implemented.

FIG. 8 illustrates an example computing environment 800 in which disclosed technologies can be implemented. The computing environment 800 includes a database 810. The database 810 includes a plurality of database objects 814, such as tables or views. The database 810 also includes a data dictionary 818, or schema, that includes information regarding the database objects 814. For example, the data dictionary 818 can include table schemas—attribute names, attribute data types, primary keys, foreign keys, alternate keys, and associations. Similarly, the data dictionary 818 can include SQL statements defining a view, including table definitions from which the view, including any intermediate views, is constructed. Thus, information in the data dictionary 818 can be used to build a graph or otherwise be used in determining paths between database objects.

In at least some aspects, the database 810 can store performance statistics 822. The performance statistics 822 can include information that can be used to determine a cost of a path between two or more tables, including a path between two target tables. Costs can include a number of tuples to be processed, a number of joins, a number of multi-node select operations, node computing resource and performance information (e.g., statistics regarding processor, memory, or network use on nodes on which data objects are stored). In some cases, the performance statistics can be part of, or include or access information in, a query plan cache. Although shown in the database 810, in other aspects, the performance statistics 822 can be maintained elsewhere in the computing environment 800.

The computing environment 800 can include a visualization client 828 that can communicate with the database 810. The visualization client 828 can include a path calculation engine or tool 832. The path calculation engine 832 can perform various functions, including reading information from the data dictionary 818 and optionally the performance statistics 822 in order to calculate paths between nodes (e.g., nodes representing database objects), which can include calculating path costs.

The path calculation engine 832 can include a white list 836 and a black list 840 that, respectively, include database objects that are required to be in a path or which are prohibited from being on a path. In some aspects, one or more database objects can be default objects in a white list 836 or a black list 840. For example, for a particular application or use case scenario, some database objects 814 can include protected or restricted information, and so can be prohibited to be accessed by some users, or can be by default marked as prohibited, which may be manually overridden by a user if it is determined that access to the database object is needed for a specific use case (and the user is sufficiently privileged). Database objects 814 can also be specified as prohibited, at least by default, if the database objects are known to be on remote or poorly performing computing nodes, or to have performance issues or otherwise are known not to provide useful access paths. Similarly, database objects 814 can be listed as required if they are known to present a low security or privacy risk, or if use of those tables typically provides performance benefits or is known to typically provide useful access paths.

In other cases, the white list 836 or the black list 840 include database objects 814 specified by a user as required or prohibited. Such specification can occur prior to an initial path calculation, can be specified after an initial path calculation, or combinations thereof (e.g., some nodes can be specified as required or prohibited prior to the initial path calculation, and nodes can be added to the lists 836, 840 as a user interacts with path information). It should be appreciated that typically a user can remove database objects 814 from a list 836, 840, whether the objects are on list by default or if the user chose to add the objects to a list. However, in some cases, a database object 814 can be placed on a list 836, 840 and that designation may not be altered by a user, or at least by a user lacking suitable privilege. As described above, it may be particularly useful to designate some database objects 814 as including sensitive information that should not be accessed, at least for some purposes or by some users. In some aspects, a path calculation engine does not include one or both of a white list 836 and a black list 840, or one or both of the lists can be available, but not used (e.g., a user may not use the lists, or the lists may not be used for an initial path calculation).

The path calculation engine 832 can include a path calculator component 844. The path calculator component 844 is configured to determine paths between two or more database objects 814 of interest, which objects are typically designated by a user, or in response to a user request. The path calculator 844 can access the white list 836 and the black list 840, if available and in use, in order to ensure that qualifying paths include, or exclude, particular database objects 814. The path calculator 844 can use any suitable technique for path calculations. As described in Example 4, the path calculator can use a depth-first traversal of database objects 814 represented as a graph. The path calculator 844 can determine paths, including constructing a graph, using information from the data dictionary 818, such as determining what database objects 814 to include in an analysis and relationships between the database objects.

The path calculation engine 832 can include a cost calculator 848. The cost calculator 848 can determine one or more costs associated with paths determined by the path calculation engine 832. Costs can be determined as a single cost, as a vector of costs, or according to a cost function. In some cases, costs can be calculated and presented to a user so that the user can consider costs in choosing a path. Displayed costs can include a total path cost, edge costs, or a combination thereof. Presenting edge costs can be useful, as it can assist a user in determining whether a particular edge or a particular database object 814 should be placed on the white list 836 or the black list 840.

In further aspects, costs can be calculated and used to limit paths that are presented to a user or to automatically select a path from available paths. For example, a threshold can be set such that paths not satisfying a threshold are not presented to a user. Or, paths can be ranked by cost, and a list of ranked paths, or at least a portion thereof (e.g., the top five most efficient paths), can be presented to a user. In some cases, the path calculation component 844 can automatically determine a most efficient path for a particular set of criteria, in which case a user need not be presented with multiple path options.

The path calculation engine 832 can include a SQL generator 852. The SQL generator 852 can generate SQL statements for all or a portion of one or more paths calculated using the path calculator 844. In aspects, the cost calculator 848 may use results of the SQL generator 852 to calculate a cost. For example, SQL statements generated by the SQL generator 852 can be used by the cost calculator 848 to estimate costs associated with a particular SQL statement, such as a number of tables accessed, a number of tuples processed, a number of join operations, a number of multi-node select operations, and computing resource use information, such as estimated processor, memory, or network use (which can include bandwidth use or a number of inter-node communications).

The visualization client 828 can include a user interface 856. The user interface 856 can allow a user to interact with the path calculation engine 832, such as to add nodes to the white list 836 or the black list 840, to view paths calculated using the path calculator 844, to view costs calculated by the cost calculator 848, or to view SQL statements for a path (or portion thereof) generated by the SQL generator 852. The user interface 856 can communicate with a renderer component 860 of the visualization client 828. The renderer component 860 can generate various displays, including the example screens 400-700 shown in FIGS. 4-7.

Example 7

Example Implementation

FIGS. 9A-9N present example VBSCRIPT (™ MICROSOFT CORP.) source code that can be used with the POWERDESIGNER (™ SAP SE) application to implement a path finding method according to the present disclosure. An InitializeObjectAttributes function, shown in FIG. 9A, can prepare data objects for use in a new pathfinding method. In particular, each node (such as corresponding to a database object) can have a variable indicating if the object has been used in a path calculation and if the object has been used in a current path calculation. Both of these variables are set to 0, or false, using the function. The function also clears a path of nodes between nodes.

An InitializeViewBuilderPackage function, also shown in FIG. 9A, creates a list of all database objects, in particular, tables, to be used in a path calculation. Variables associated with these tables, such as whether they have been used in a current path or are part of a determined path can be reset in the function. With reference to FIG. 9B, an IterateReferenceCollection function can determine whether a particular reference, or edge, links to a source table either as the starting point or ending point of the edge. If the node is determined to be in a list of objects to be analyzed, the FindMyPath function is called to determine a path from the source object (node) to the target node.

With continued reference to FIG. 9B, a SaveMyCalcPathToObject function creates new paths to be associated with objects (nodes). When a new path is created, a global path counter is iterated to track the number of paths that have been calculated. With reference to FIG. 9C, a IterateRelations function determines if a IterateReferenceCollection function returns true for input edges and output edges for the source object (node).

FIG. 9D presents code for a FindMyPath function. The FindMyPath function saves path information to a current node being examined ("SourceObj"). If the current node is the target, final destination node, the node is marked as having been used in a path calculation and as visited during a current path calculation, and the number of paths found is incremented. Otherwise, if the node is not the target node, it is determined whether the node has already been used in a path or visited as part of a current path. If either of those conditions is true, the node is not further processed, to avoid circular paths. However, as discussed above, in some cases, such as if a node is required for a valid path, nodes can be visited multiple time in a current path calculation. Otherwise, the InterateRelations function is called. If a path is identified, the node is marked as visited in a current path and used in a path.

A CalculateInitialNodes function, shown in FIG. 9E, can be used to obtain target nodes that are to be included in a calculation path. Nodes are obtained which are to be analyzed to determine whether they are on a path to a target node, and path and other information is initialized. FIGS. 9E-9G illustrate code for a ReduceCalculationObjectsList function. This function can be used to ready data for display, including removing nodes that were not determined to be in a path between target nodes (e.g., the starting node and the destination node) and saving path information.

The ReduceCalculationObjectsList function can call the FindObjectsInArray function shown in FIG. 9H, such as to determine whether a node is in a list of nodes associated with a path between target nodes. In constructing a display, the FindReferenceBetween function can be used to determine if an edge should be placed between two nodes, such as nodes that were determined to be displayed using the ReduceCalculationObjectsList function of FIGS. 9E-9G. The FindReferenceBetween function can be called by the myDiagramAttachPaths function of FIG. 9I.

Graphs of nodes with paths between target nodes, including path information, can be displayed using the CreateInitialDiagram function of FIG. 9J. The function causes all the non-removed nodes (e.g., nodes associated with paths) to be displayed, and the edges to be added by calling the myDiagramAttachPaths function. A main function for calling the functionality of the functions of FIGS. 9A-9J is presented in FIG. 9J.

FIGS. 9K and 9L illustrate code for a CalcPath class. The CalcPath class includes data members for nodes (objects) and edges (relations) in a path. As illustrated in FIG. 9K, the CalcPath class includes functions for adding nodes, edges, or an edge and its associated node to a path. FIG. 9K further illustrates a ContainsAllObjects function that determines if a group of nodes, provided as an argument in a function call, is included in a particular path. The ContainsAllObjects function can be used to enforce white lists by including the relevant, white-listed nodes in the function argument. FIG. 9L illustrates that the CalcPath class includes functions for copying paths (e.g., implementing an assignment operation for the CalcPath class) and for copying an array representing objects in a path and for copying an array of path edges.

FIG. 9M illustrates code for an IsObjectInCollection function, which can be used to determine whether a given node is present in a given collection of nodes. FIG. 9N illustrates code for a AddMyObjectsFromPackage function that can be used to populate nodes that should be included in a path calculation process, such as including tables from a particular schema (which can be represented as a package referencing tables in the schema).

FIG. 9N also illustrates code for a Define as Important subroutine and a Remove from Calculation Subroutine. These subroutines can be used to implement adding and removing nodes to and from a white list. The Define as Important subroutine adds a selected node to a myCalcObjectCollection that implements the white list, and updates a display to indicate that the node is a required node. The Remove from Calculation subroutine removes nodes from the white list.

Example 8

Example Operations for Path Determination and Selection

Figure 10:
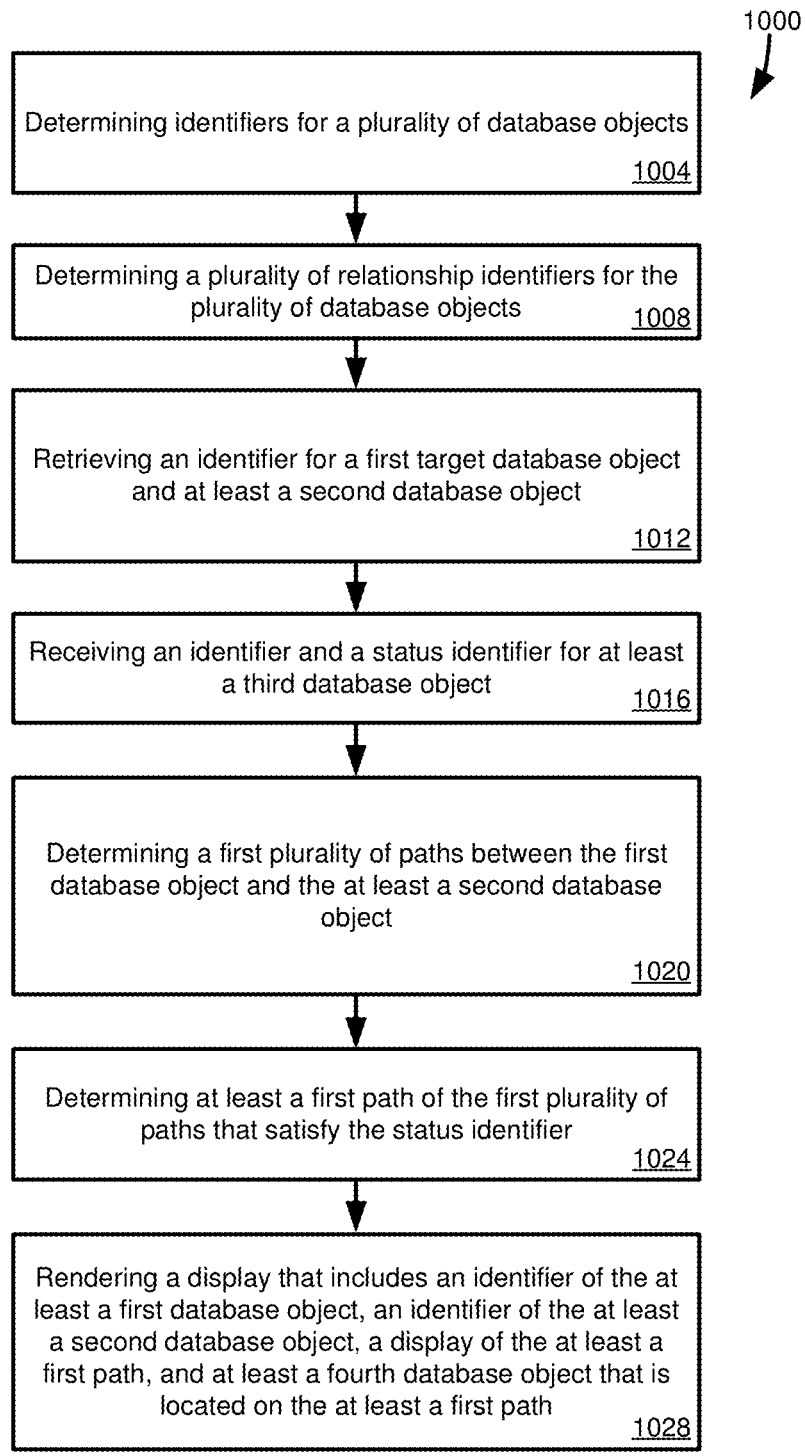
FIG. 10 is a flowchart illustrating operations in a method of determining relationships between database objects.

FIG. 10 is a flowchart of an example method 1000 of determining relationships between database objects, such as tables or views. In some aspects, the method 1000 can be carried out using the computing environment 800 of FIG. 8.

At 1004, identifiers are determined for a plurality of database objects, such as tables or views. The identifiers, such as a name for the table or view, can be used to access the database objects in the database, or access data associated with the database objects, such as schema information (e.g., information defining attributes, including names and data types, for the database objects, and relationship information, such as foreign key or association relationships, with other database objects).

A plurality of relationship identifiers for the plurality of database objects are determined at 1008. A relationship identifier, such as a foreign key or an association (e.g., a reference to an alternate key), specifies an access pathway for a database object of the plurality of objects to retrieve data from, or access data in, another database object of the plurality of database objects. Each database object of the plurality of database objects is connected to at least one other database object of the plurality of database objects through a relationship identifier of the plurality of relationship identifiers.

At 1012, an identifier is received for a first target database object of the plurality of database objects and at least a second target database object of the plurality of database object, where paths are to be determined between the first database object and the at least a second database object. An identifier for at least a third database object is received at 1016. A status identifier is also received for the at least a third database object. The status identifier indicates whether the third database object must be included in paths between the first database object and the at least a second database object or whether the third database object must not be included in paths between the first database object and the at least a second database object.

At 1020, a first plurality of paths are determined between the first database object and the at least a second database object. At least a first path of the first plurality of paths that satisfies the status identifier is determined at 1024. At 1028, a display is rendered that includes an identifier of the at least a first database object, an identifier of the at least a second database object, a display of the at least first path, and at least a fourth database object that is located on the at least a first path.

Figure 11:
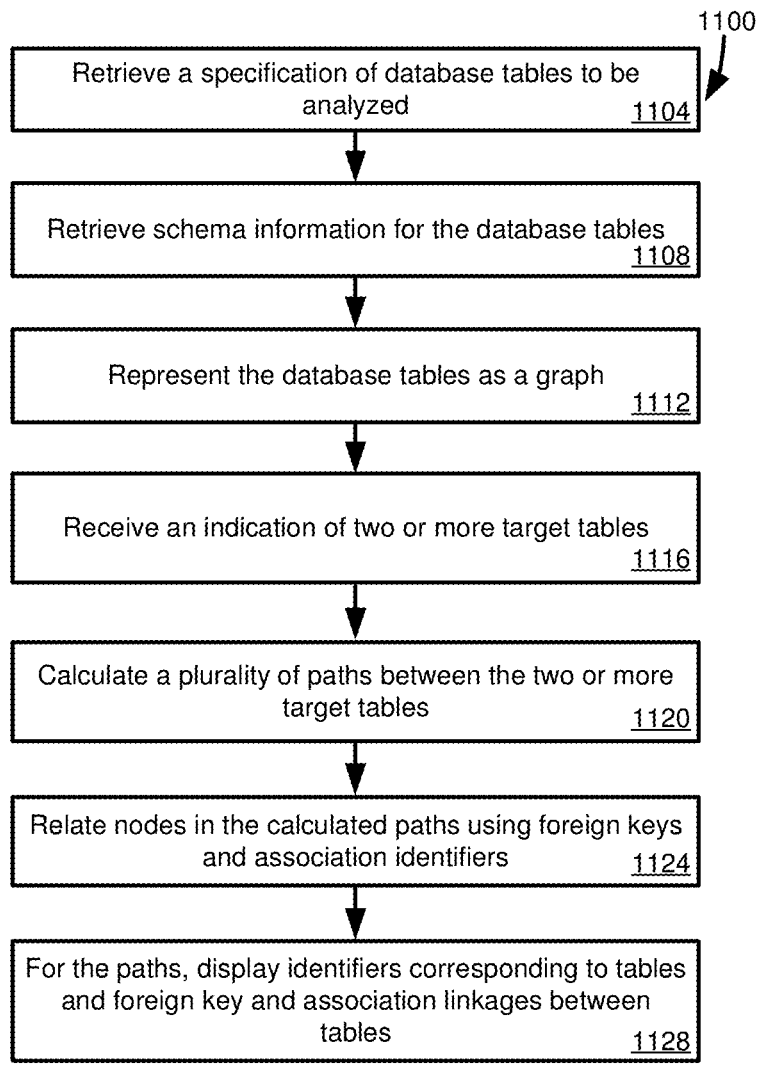
FIG. 11 is a flowchart illustrating operations in a method that can be carried out by a pathway determination tool.

FIG. 11 is a flowchart of an example method 1100 that can be carried out by a pathway determination tool. The method 1100 can be carried out, in some aspects, using the computing environment 800 of FIG. 8.

At 1104, a specification of database tables to be analyzed is retrieved. The specification can be a package that includes a name, reference, or other table identifier that can be used to retrieve table data or metadata. Schema data for the database tables is retrieved at 1108, such as using the identifiers in the table specification. The schema information includes foreign key and association identifiers (e.g., references to alternate keys) indicating relationships between the database tables. For a given table, a first set of one or more attributes serves to make the table a referenced or referencing table (e.g., a primary key that can be used to reference the table or a foreign key that can be used to reference another table). A second set of one or more attributes serves to make the table a referenced or referencing table. At least one attribute of the first set differs from an attribute of the second set.

The database tables are represented as a graph at 1112. The database tables are represented as nodes and the foreign keys and association identifiers are used to define edges between the nodes, where, for a given direction, a single edge connects a pair of related nodes. That is, the edges do not indicate attributes associated with the foreign keys or associations. An indication of two or more target tables is received at 1116, where a plurality of paths is to be calculated between the nodes representing the target tables. At 1120, a plurality of paths are calculated between the two or more target tables. For the calculated paths, at 1124, nodes are related using their corresponding foreign keys and association identifiers. At 1128, identifiers for tables corresponding to nodes in the calculated paths and linkages between the tables corresponding to the foreign keys and the association identifiers are rendered for display.

Figure 12:
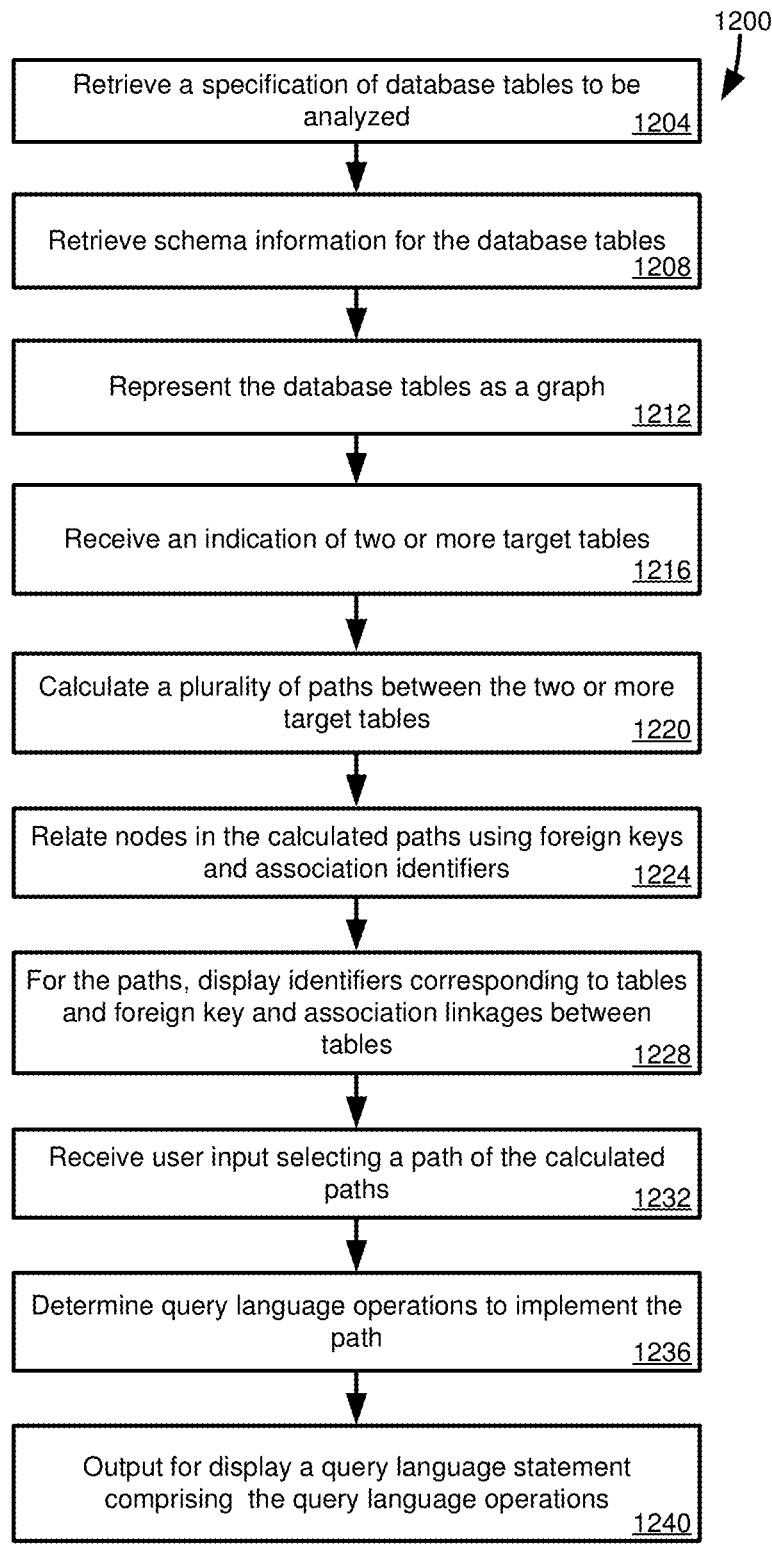
FIG. 12 is a flowchart illustrating operations in a method of generating a query language statement representing a path between first and second database tables.

FIG. 12 is a flowchart of an example method 1200 of generating a query language statement representing a path between first and second database tables, the path including at least one additional database table. The method 1200 can be carried out, in some aspects, using the computing environment 800 of FIG. 8.

At 1204, a specification of database tables to be analyzed is retrieved. The specification can be a package that includes a name, reference, or other table identifier that can be used to retrieve table data or metadata. Schema data for the database tables is retrieved at 1208, such as using the identifiers in the table specification. The schema information includes foreign key and association identifiers (e.g., references to alternate keys) indicating relationships between the database tables. For a given table, a first set of one or more attributes serves to make the table a referenced or referencing table (e.g., a primary key that can be used to reference the table or a foreign key that can be used to reference another table). A second set of one or more attributes serves to make the table a referenced or referencing table. At least one attribute of the first set differs from an attribute of the second set.

The database tables are represented as a graph at 1212. The database tables are represented as nodes and the foreign keys and association identifiers are used to define edges between the nodes, where, for a given direction, a single edge connects a pair of related nodes. That is, the edges do not indicate attributes associated with the foreign keys or associations.

An indication of two or more target tables is received at 1216, where a plurality of paths is to be calculated between the nodes representing the target tables. At 1220, a plurality of paths are calculated between the two or more target tables. For the calculated paths, at 1224, nodes are related using their corresponding foreign keys and association identifiers. At 1228, identifiers for tables corresponding to nodes in the calculated paths and linkages between the tables corresponding to the foreign keys and the association identifiers are rendered for display.

User input selecting a path of the calculated paths is received at 1232. At 1236, query language operations to implement the path are determined. A query language statement that includes the query language operations is output for display at 1240. In some cases, the query language operations can be executed to retrieve data from a database system that includes the one or more target tables and one or more tables in the selected path.

Example 9

Computing Systems

Figure 13:
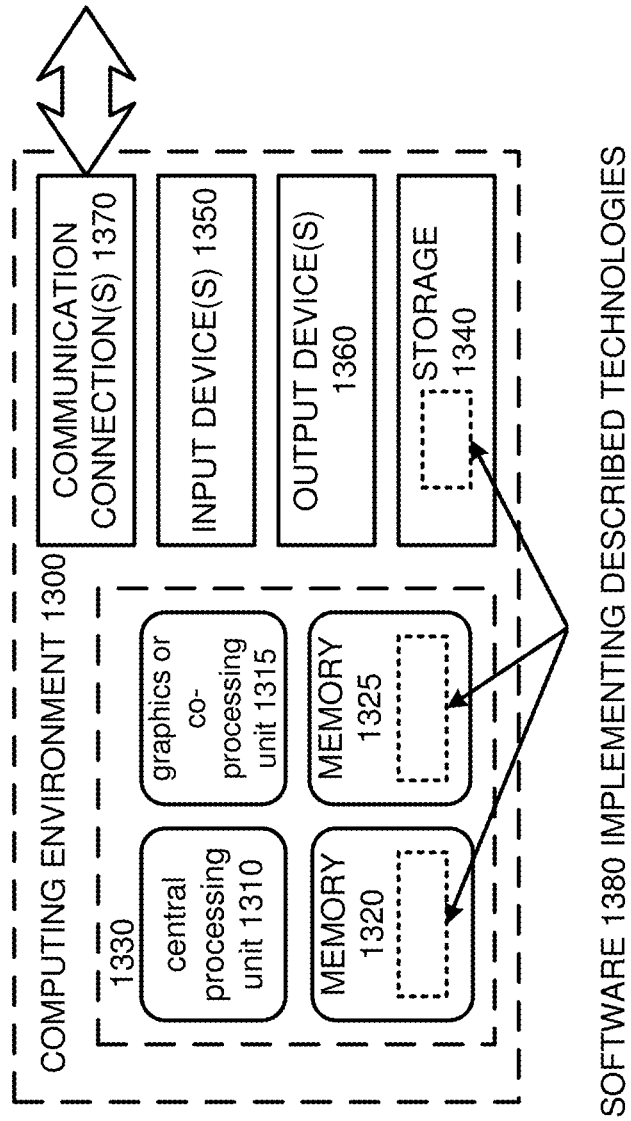
FIG. 13 is a diagram of an example computing system in which some described embodiments can be implemented.

FIG. 13 depicts a generalized example of a suitable computing system 1300 in which the described innovations may be implemented. The computing system 1300 is not intended to suggest any limitation as to scope of use or functionality of the present disclosure, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing components of the computing environment 800 of FIG. 8. A processing unit can be a general-purpose central processing unit (CPU), processor in an application-specific integrated circuit (ASIC), or any other type of processor.

In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315.

A computing system 1300 may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10

Cloud Computing Environment

Figure 14:
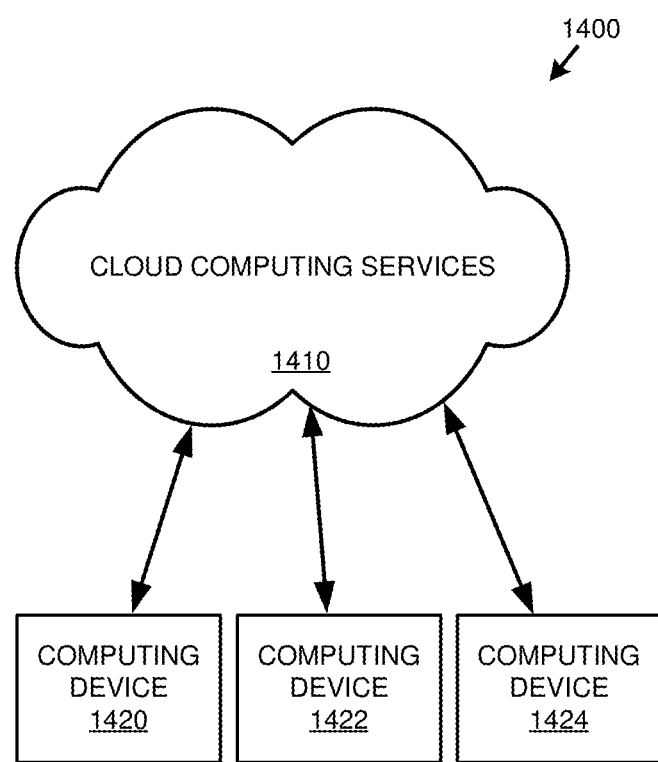
FIG. 14 is an example cloud computing environment that can be used in conjunction with the technologies described herein.

FIG. 14 depicts an example cloud computing environment 1400 in which the described technologies can be implemented. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operators (e.g., data processing, data storage, and the like).

Example 11

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 13, computer-readable storage media include memory 1320 and 1325, and storage 1340. The term computer-readable storage media does not include signals and carrier waves. In addition, the term computer-readable storage media does not include communication connections (e.g., 1370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
    at least one memory;
    one or more hardware processing units coupled to the at least one memory; and
    one or more computer readable storage media storing instructions that, when executed, cause the computing system to perform processing comprising:
        determining identifiers for a plurality of database objects;
        determining a plurality of relationship identifiers for the plurality of database objects, wherein a relationship identifier specifies an access pathway for a database object of the plurality of database objects, or a process that accesses such database object, to retrieve data from another database object of the plurality of database objects, wherein each database object of the plurality of database objects is connected to at least one other database object of the plurality of database objects through a relationship identifier of the plurality of relationship identifiers;
        receiving an identifier for a first target database object of the plurality of database objects and at least a second target database object of the plurality of database objects, wherein paths are to be determined between the first database object and the at least a second database object;
        receiving an identifier for at least a third database object of the plurality of database objects and a status identifier indicating whether the third database object must be included in paths between the first database object and the at least a second database object or whether the third database object must not be included in paths between the first database object and the at least a second database object;
        determining a plurality of paths between the first database object and the at least a second database object that satisfy the status identifier;
        selecting at least a first path of the plurality of paths that satisfies the status identifier;
        calculating operations to implement the first path; and
        outputting the operations.

2. The computing system of claim 1, wherein calculating operations to implement the first path comprises determining query language operations to implement the first path.

3. The computing system of claim 1, where calculating operations comprises generating SQL code to implement the operations.

4. The computing system of claim 1, the processing further comprising:
    calculating respective path costs for at least multiple paths of the plurality of paths;
    comparing at least a portion of the path costs with path selection criteria; and
    selecting the first path based at least in part on the comparing.

5. The computing system of claim 4, wherein the path selection criteria comprises one or more indicators of query complexity or one or more indicators of computing resource use for a database process that uses a given path of the plurality of paths.

6. The computing system of claim 5, wherein the path selection criteria comprises one or more criteria selected from the group consisting of a lowest number of tuples processed, a fewest number of joins, a fewest number of multi-table select statements, and a fastest execution time.

7. The computing system of claim 5, wherein the path selection criteria comprises one or more criteria selected from the group consisting of network use, memory use, and processor use.

8. The computing system of claim 4, wherein the first path is not selected based on user input selecting the first path.

9. The computing system of claim 4, wherein the first path is automatically selected based on the comparing.

10. The computing system of claim 1, wherein determining a plurality of paths comprises representing at least a portion of the plurality of database objects as nodes in a graph, where edges connecting the nodes represent relationships between the nodes specified by the relationship identifiers.

11. The computing system of claim 10, the processing further comprising:
    assigning a weight to at least a portion of the edges, wherein the weight represents a query complexity or computing resource use cost for including the edge in a path of the plurality of paths.

12. The computing system of claim 1, the processing further comprising:
    receiving user input from a user that causes the plurality of paths to be generated;
    determining that the user does not have access to the third database object;
    based on determining that the user does not have access to the third database object, setting the status indicator to indicate that the third database object must not be included in paths of the plurality of paths.

13. The computing system of claim 1, the processing further comprising:
    determining that the third database object comprises restricted information; and
    based on the determining that the third database object comprises restricted information, setting the status indicator to indicate that the third database object must not be included in paths of the plurality of paths.

14. The computing system of claim 1, the processing further comprising:
receiving a query, wherein the query specifies the first database object and the at least a second database object, and wherein the determining a plurality of paths is performed based on the receiving the query.

15. The computing system of claim 1, wherein determining a plurality of paths comprises:
determining connections between at least a portion of the plurality of database objects using the relationship identifiers, but wherein individual relationship identifiers are not used in determining the plurality of paths; and
after determining the plurality of paths, determining relationship identifiers connecting database objects in the plurality of paths.

16. The computing system of claim 1, wherein at least a portion of the plurality of database objects are tables, each table comprising a plurality of attributes, at least one pair of tables of the tables comprises multiple sets of one or more attributes of a first table of the pair that associates the first table with one or more sets of one or more attributes of the second table.

17. The computing system of claim 1, the processing further comprising:
rendering for display identifiers for database objects of the plurality of database objects in the plurality of paths and linkages between the database objects corresponding to relationship identifiers of the plurality of relationship identifiers, wherein the rendering produces a user interface display;
receiving through a user interface comprising the user interface display first user input selecting at least a first identifier, for a first database object of the database objects, of the identifiers for database objects in the plurality of paths, wherein the first user input indicates that the first database object must not be included in the plurality of paths; and
in response to the first user input, updating the user interface display to remove paths of the plurality of paths that include the first database object.

18. The computing system of claim 17, the processing further comprising:
receiving through the user interface comprising the user interface display second user input selecting at least a second identifier, for a second database object of the database objects, of the identifiers for database objects in the plurality of paths, wherein the second user input indicates that the second database object must be included in the plurality of paths and the second identifier is different than the first identifier; and
in response to the second user input, updating the user interface display to remove paths of the plurality of paths that do not include the second database object.

19. The computing system of claim 1, the processing further comprising:
rendering for display identifiers for database objects of the plurality of database objects in the plurality of paths and linkages between the database objects corresponding to relationship identifiers of the plurality of relationship identifiers, wherein the rendering produces a user interface display;
receiving through a user interface comprising the user interface display first user input selecting at least a first identifier, for a first database object of the database objects, of the identifiers for database objects in the plurality of paths, wherein the first user input indicates that the first database object must be included in the plurality of paths; and
in response to the first user input, updating the user interface display to remove paths of the plurality of paths that do not include the first database object.

20. The computing system of claim 19, the processing further comprising:
receiving through the user interface comprising the user interface display second user input selecting at least a second identifier, for a second database object of the database objects, of the identifiers for database objects in the plurality of paths, wherein the second user input indicates that the second database object must not be included in the plurality of paths and the second indicator is different than the first indicator; and
in response to the second user input, updating the user interface display to remove paths of the plurality of paths that include the second database object.

21. The computing system of claim 1, the processing further comprising:
rendering for display identifiers for database objects of the plurality of database objects in the plurality of paths and linkages between the database objects corresponding to relationship identifiers of the plurality of relationship identifiers, wherein the rendering produces a user interface display;
receiving through a user interface comprising the user interface display first user input selecting a first linkage between a pair of database objects of the database objects, wherein the first user input indicates that the first linkage must not be included in the plurality of paths; and
in response to the first user input, updating the user interface display to remove paths of the plurality of paths that include the first linkage.

22. The computing system of claim 1, the processing further comprising:
rendering for display identifiers for database objects of the plurality of database objects in the plurality of paths and linkages between the database objects corresponding to relationship identifiers of the plurality of relationship identifiers, wherein the rendering produces a user interface display;
receiving through a user interface comprising the user interface display first user input selecting a first linkage between a pair of database objects of the database objects, wherein the first user input indicates that the first linkage must be included in the plurality of paths; and
in response to the first user input, updating the user interface display to remove paths of the plurality of paths that do not include the first linkage.

23. The system of claim 1, the processing further comprising:
rendering for display identifiers for database objects of the plurality of database objects in the plurality of paths and linkages between the database objects corresponding to relationship identifiers of the plurality of relationship identifiers, wherein the rendering produces a user interface display;
receiving through a user interface comprising the user interface display user input selecting a path of the plurality of paths, wherein the calculating and outputting are carried out in response to the receiving the user input.

24. One or more computer-readable storage media comprising:
- computer-executable instructions, that, when executed by a computing system comprising at least one memory and at least one hardware processor coupled to the at least one memory, cause the computing system to determine identifiers for a plurality of database objects;
- computer-executable instructions, that, when executed by the computing system, cause the computing system to determine a plurality of relationship identifiers for the plurality of database objects, wherein a relationship identifier specifies an access pathway for a database object of the plurality of database objects, or a process that accesses such database object, to retrieve data from another database object of the plurality of database objects, wherein each database object of the plurality of database objects is connected to at least one other database object of the plurality of database objects through a relationship identifier of the plurality of relationship identifiers;
- computer-executable instructions, that, when executed by the computing system, cause the computing system to receive an identifier for a first target database object of the plurality of database objects and at least a second target database object of the plurality of database objects, wherein paths are to be determined between the first database object and the at least a second database object;
- computer-executable instructions, that, when executed by the computing system, cause the computing system to receive an identifier for at least a third database object of the plurality of database objects and a status identifier indicating whether the third database object must be included in paths between the first database object and the at least a second database object or whether the third database object must not be included in paths between the first database object and the at least a second database object;
- computer-executable instructions, that, when executed by the computing system, cause the computing system to determine a plurality of paths between the first database object and the at least a second database object that satisfy the status identifier;
- computer-executable instructions, that, when executed by the computing system, cause the computing system to select at least a first path of the plurality of paths that satisfies the status identifier;
- computer-executable instructions, that, when executed by the computing system, cause the computing system to calculate operations to implement the first path; and
- computer-executable instructions, that, when executed by the computing system, cause the computing system to output the operations.

25. The one or more computer-readable storage media of claim 24, wherein calculating operations comprises generating SQL code to implement the operations, further comprising:
- computer-executable instructions, that, when executed by the computing system, cause the computing system to calculate respective path costs for at least multiple paths of the plurality of paths;
- computer-executable instructions, that, when executed by the computing system, cause the computing system to compare at least a portion of the path costs with path selection criteria, wherein the path selection criteria comprises one or more indicators of query complexity or one or more indicators of computing resource use for a database process that uses a given path of the plurality of paths; and
- computer-executable instructions, that, when executed by the computing system, cause the computing system to select the first path based at least in part on the comparing;
- wherein the first path is not selected based on user input selecting the first path and is selected automatically based on the comparing.

26. A method, implemented in a computing environment comprising at least one hardware processor and at least one memory coupled to the at least one hardware processor, comprising:
- determining identifiers for a plurality of database objects;
- determining a plurality of relationship identifiers for the plurality of database objects, wherein a relationship identifier specifies an access pathway for a database object of the plurality of database objects, or a process that accesses such database object, to retrieve data from another database object of the plurality of database objects, wherein each database object of the plurality of database objects is connected to at least one other database object of the plurality of database objects through a relationship identifier of the plurality of relationship identifiers;
- receiving an identifier for a first target database object of the plurality of database objects and at least a second target database object of the plurality of database objects, wherein paths are to be determined between the first database object and the at least a second database object;
- receiving an identifier for at least a third database object of the plurality of database objects and a status identifier indicating whether the third database object must be included in paths between the first database object and the at least a second database object or whether the third database object must not be included in paths between the first database object and the at least a second database object;
- determining a plurality of paths between the first database object and the at least a second database object that satisfy the status identifier;
- selecting at least a first path of the plurality of paths that satisfies the status identifier;
- calculating operations to implement the first path; and
- outputting the operations.

27. The method of claim 26, wherein calculating operations comprises generating SQL code to implement the operations, the method further comprising:
- calculating respective path costs for at least multiple paths of the plurality of paths;
- comparing at least a portion of the path costs with path selection criteria, wherein the path selection criteria comprises one or more indicators of query complexity or one or more indicators of computing resource use for a database process that uses a given path of the plurality of paths; and
- selecting the first path based at least in part on the comparing;
- wherein the first path is not selected based on user input selecting the first path and is selected automatically based on the comparing.

* * * * *